United States Patent
Ozawa et al.

(10) Patent No.: US 6,289,571 B1
(45) Date of Patent: *Sep. 18, 2001

(54) MANUFACTURING PROCESS OF ANTIVIBRATION DEVICE

(75) Inventors: Shougo Ozawa; Yuuji Mutou; Toyoji Shimokawa; Kazutoshi Satori, all of Saitama (JP)

(73) Assignee: Yamashita Rubber Kabushiki Kaisha, Saitama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,453

(22) Filed: May 15, 1998

(30) Foreign Application Priority Data

| May 16, 1997 | (JP) | 9-127634 |
| May 16, 1997 | (JP) | 9-127635 |
| May 16, 1997 | (JP) | 9-127636 |
| May 16, 1997 | (JP) | 9-127637 |

(51) Int. Cl.[7] .................................................. B21D 39/00
(52) U.S. Cl. ..................... 29/521; 267/140.14; 29/525.01
(58) Field of Search .................................. 29/521, 522.1, 29/523, 525.01, 897.2, 458, 464, 896.3; 267/140.13, 140.15, 219, 140.14

(56) References Cited

U.S. PATENT DOCUMENTS

| 1,884,477 | * | 10/1932 | Wood . |
| 2,744,543 | * | 5/1956 | Brady . |
| 4,159,091 | * | 6/1979 | Le Salver et al. . |
| 4,199,128 | * | 4/1980 | Van Den Boom et al. . |
| 4,401,298 | * | 8/1983 | Eaton et al. . |
| 4,746,104 | * | 5/1988 | Probst ................................. 267/219 |
| 4,815,576 | * | 3/1989 | Tanaka . |
| 4,880,216 | * | 11/1989 | Hartel et al. ........................... 267/219 |
| 4,998,345 | * | 3/1991 | Funahashi et al. . |
| 5,002,164 | * | 3/1991 | Bowyer . |
| 5,205,205 | * | 4/1993 | Choinski et al. . |
| 5,240,233 | * | 8/1993 | Kato et al. ............................ 29/897.2 |
| 5,295,671 | * | 3/1994 | Nakagaki et al. . |
| 5,878,494 | * | 3/1999 | Hamaekers ......................... 29/896.93 |
| 5,906,360 | * | 5/1999 | Kanda .................................... 29/446 |

FOREIGN PATENT DOCUMENTS

| 8 177959A | 7/1996 | (JP) . |
| 8 270716A | 10/1996 | (JP) . |
| 8 320048A | 12/1996 | (JP) . |
| 8 338471A | 12/1996 | (JP) . |

* cited by examiner

*Primary Examiner*—P. W. Echols
*Assistant Examiner*—Steve Blount

(57) ABSTRACT

In a manufacturing of an anti-vibration device comprising, an elastic member 3 of a generally truncated cone shape when viewed from a side, a first mounting member 1 is connected to an upper portion thereof, a second mounting member 2 is connected to a lower portion thereof, a stopper projection 12 projects from the first mounting member 1 to a side portion to be capable to abut a half round side portion of the elastic member 3, and a stopper metal member 35 extends from the second mounting member 2 through an outside of the stopper projection 12 to cover the about half round side portion of the elastic member 3 to the first mounting member 1 side with a stopper receiving portion 36 by bending an apex portion thereof to superpose on the stopper projection 12 with a specified gap. The stopper receiving portion 36 can be formed by caulking or the like after the molding the elastic member 3. For this reason, the stopper projection 12 is formed on the pivot plate 6 shaped in a circular when viewed from the side and after the stopper receiving portion 36 is formed in a half circular shape, the pivot plate 6 is admitted inside and is made to rotate.

7 Claims, 21 Drawing Sheets

MANUFACTURING PROCESS OF ANTIVIBRATION DEVICE

BACKGROUND OF THE INVENTION

1. Field of the Invention

This invention relates to a manufacturing process of an anti-vibration device used as an engine mount and the like for mounting an engine of an automobile on a vehicle body with an aim of isolating the vibration.

2. Description of the Prior Art

It is well known to provide such an engine mount comprising an elastic member generally of a truncated cone shape when viewed from a side, a first mounting, member is connected to an upper side thereof, a second mounting member is connected to a lower side thereof, and a stopper projection projects from the first mounting member in a side direction to be able to abut to an about a half round side portion of the elastic member. A stopper member extends from the second mounting member through an outer portion of the stopper and projects to the first mounting member side to cover the half round side portion of the elastic member and forms a stopper receiving portion in which an apex portion thereof is bent to overlap on the stopper projection with a specified gap between the stopper projection and the stopper receiving portion. (For example, such a device is disclosed in Japanese Laid-Open Patent Publication (Kokai) No. Hei8-177956, Hei8-270716, Hei8-320048 and Hei8-338471.)

To manufacture the engine mount, at first, the first mounting member that is not mounted the stopper projection and the second mounting member that is not formed on the stopper receiving portion were integrated by baking with rubber such as the elastic member. Thereafter, the stopper projection is attached on the first mounting member and the stopper member is attached on the second mounting member to overlap the stopper receiving portion on the stopper projection with a specified gap in a center line direction of the elastic member.

It is well known to overlap each peripheral portion of two circular members provided in such an engine mount, to arrange a metal-made ring member for caulking along an outer peripheral portion, to bent the ring caulking member to be in U-shaped section and to connect the peripheral portion of the two circular members by caulking.

Further, it is well known to use a liquid sealed type anti-vibration rubber device for such an engine mount. There is generally provided a device comprising a first mounting member secured to one side of either a vehicle body or a vibrating member, a second mounting member secured to the other side of a vehicle body or a vibrating member, an elastic member connected between the first and second mounting member shaped in a partially cylindrical having a concave portion disposed therein and being opened an end portion thereof, a diaphragm closing an opened portion of the concave portion so as to form a liquid chamber filled with liquid between the elastic member therewith, a partitioning wall for dividing the liquid chamber into two chambers as a main liquid chamber, and a sub liquid chamber and an orifice for communicating between the two liquid chambers.

In order to assemble the liquid sealed type anti-vibration rubber device, in advance, a top side assembly integrated with the first mounting member and the elastic member, and a bottom side assembly integrated with the second mounting member and the diaphragm, are formed and each assembly is immersed into a liquid bath filled with filling liquid.

While controlling the liquid volume to be charged with the specified value in the liquid bath, the bottom side assembly is fitted in an end portion of a cylindrical metal member and the top side assembly and the bottom side assembly are mounted to a liquid sealing jig while keeping the fitting condition thereof.

Thereafter, the top side assembly and the bottom side assembly are taken out from the liquid bath in the state of being fitted to the liquid sealing jig and secured to a roll caulking machine at the outside of the liquid bath. Then, the bottom side assembly and top side assembly are connected by roll caulking an apex portion of the cylindrical metal member in the state of removing the fluid sealing jig.

In this case, an end portion of the cylindrical metal member provided on a peripheral portion of the elastic member is made to be a connecting portion fixing the partitioning member and the diaphragm by caulking, the elastic member side is immersed into liquid in a stage before caulking the connecting portion and liquid is charged into the inner main liquid chamber side. The partitioning member and the diaphragm are accommodated inside of an end portion of the cylindrical metal member. After taken out from the liquid bath, the end portion of the cylindrical metal member is adapted to be caulked with the partitioning member and the diaphragm.

In the case of a construction providing said stopper member, when the stopper member is secured in another process after forming of the elastic member, since it is required to take a means of welding or bolt fastening, it is difficult to ensure a precision control concerning to the retaining dimensions between the first mounting member and the stopper receiving portion.

OBJECTS OF THE INVENTION

Therefore, it is desirable that, in advance, the stopper member is integrated to the second mounting member while molding of the elastic member. After molding of the elastic member, the stopper receiving portion is formed. The stopper projection is admitted to a stopper space formed between the elastic member and the stopper metal member including the stopper receiving portion after processing of the stopper receiving portion so as not to disturb the processing of the stopper receiving portion.

However, if such a process is intended to be adopted, since it is impossible to take out the jig after processing the stopper receiving portion and to admit the stopper projection into the stopper space, the process has not been actualized until now.

It is therefore an first object of the present invention to solve such a problem.

In the case of adopting said method of connecting the two circular members by caulking, when the ring member for caulking is bent in a substantially U shape, a bending point is apt to be irregular. Especially in the case that these two circular members are soft member such as rubber relatively easily deformable, a bending region is apt to be not sharp and inaccurate. Moreover, when the connecting is required airtight, it is feared that the airtight is harmed.

To prevent such a situation, it is considered that the peripheral end portion of the two circular members are reinforced beforehand by securing a hemming member formed in a U shaped section and a ring member for caulking is caulked thereon. But in the case of adopting such a process, since the specially formed hemming member has to be prepared, much time and cost are required. It is therefore a second object of the present invention to make easy such a caulking process.

Further, in the assembling method of said fluid sealed mount, when the liquid sealing jig is assembled or disassembled, an extremely careful treatment is required until finishing a roll caulking to keep the sealing performance so as not to leak the filled liquid in the liquid bath until finishing a roll caulking. Thus roll caulking is processed outside of the liquid bath. This makes it difficult to improve the processing efficiency. It is therefore a third object of the present invention to make the caulking process easy while the liquid is filled.

Moreover, because the initial liquid pressure value of the liquid sealed anti-vibration device affect seriously the performance of the anti-vibration device, it is extremely important in the quality control that the filled liquid volume is strictly controlled and the liquid pressure value of the assembled products is maintained in the specified initial value.

However, in the above mentioned usual method, it is apt to be incapable to secure the specified fluid pressure, because more liquid than the specified volume is filled due to an easy deformation of the diaphragm. Besides, since the accurate fluid pressure measurement is made to be possible for the first time after completing the assembly finished the caulking process, it has been difficult to control the quality and to improve a yield rate of the products. It is therefore a fourth object of the present invention to make easy the control of the filled liquid volume easy. Other objects of the present invention will be obvious in the following detail description.

SUMMARY OF THE INVENTION

In order to solve the problems described above, according to the first embodiment of the present invention, there is provided a manufacturing process of an anti-vibration device comprising an elastic member of a generally truncated cone shape when viewed from a side, a first mounting member is connected to an upper portion thereof, a second mounting member is connected to a lower portion thereof, a stopper projection projects from the first mounting member to a side portion to be capable to abut a on about half round side portion of the elastic member, and a stopper metal member extending externals from the second mounting member through an outside of the stopper projection to cover the about a half round side portion of the elastic member to the first mounting member side with a stopper receiving portion by bending an apex portion thereof to superpose on the stopper projection with a specified gap, wherein said process comprises the steps of, integrating the first mounting member not mounted on the stopper projection and the second mounting member not formed on the stopper receiving portion, covering a jig on the first mounting member, placing a side projecting portion for forming the stopper receiving portion between the elastic member and the stopper member, bending the apex portion of the stopper member on the side projecting portion, and taking out the jig by about a half of a rotation around a center line of the elastic member and moving the side projecting portion to a place not providing on the stopper member.

When using such a process, since the stopper metal member is provided to cover about a half side portion of the elastic member and the side projecting portion of the jig corresponding to the stopper metal member is sufficient to be about half circular, it is possible to take out the jig by rotating after processing the stopper receiving portion.

Therefore, since while forming of the elastic member, the stopper metal member is integrated in advance with the second mount member side, and after forming the elastic member, the stopper receiving portion may be formed by caulking or the like, precision control of the stopper receiving portion can be made easy.

In this time, since the stopper receiving portion is bent to a center direction of the elastic member, namely, inside direction, a diameter is contracted and excessive material is produced. If the excessive material is gathered in a place and a bead portion is formed, stiffness of the stopper receiving portion can be raised by the bead portion.

Further, if a pivot plate secured with a stopper projection on about half round portion thereof is mounted to a mounting shaft of the first mounting member after taking out of the jig, and the stopper projection is positioned on a side not mounting the stopper member of the elastic member and then the pivot plate is made to rotate about half round, the stopper projection can be admitted between the elastic member and the stopper receiving portion and can be fixed later to this position by a rotation stopper.

Therefore, it is possible to admit the stopper projection between the elastic member and the stopper receiving portion in order not to disturb the processing of the stopper receiving portion after processing the stopper receiving portion.

A caulking process of an anti-vibration device according to the second embodiment of the present invention comprises a process; superposing each peripheral portion of two circular members, connecting each outer peripheral portion of said two circular members by bending a metal caulking member arranged along each outer peripheral portion in the shape of a substantially U section, wherein the process, arranges after rolling a rolled strap shaped support ring to run along the peripheral portion of said circular member before caulking said ring caulking member, and bending said ring caulking member to wrap the support ring inside.

When using such a process, since a rolled strap shaped support ring is arranged to run along the peripheral portion of the circular member before caulking the ring caulking member and the ring caulking member is bent to wrap the support ring inside, the ring caulking member can be sharply bent at a contact portion with the support ring.

Therefore, the support ring function to give a bending point in the time of caulking the ring caulking member, and which makes it possible to bend sharply and accurately.

Moreover, since the support ring is sufficient to be the simple strap shaped member and the rolling process thereof in a ring shape is not a process requiring a special precision and is sufficient to be a manual work level permitting rather dispersion, a material cost and a processing cost are remarkably inexpensive as compared with an effect attained when used and it is possible to reduce this kind of processing cost.

In this time, even though said two circular members are adapted to be formed from relatively easily deformable nonmetal material, it is possible to bend sharply a support ring as well.

When said two circular members are composed to form an enclosed space by the arranging each member face to face, at least either member of the circular members is formed from a soft elastic material, the outer peripheral portion of the soft elastic member is integrated with an inner side of said ring caulking member and an outer peripheral side of the ring caulking member is caulked to wrap an outer peripheral portion of said another circular member. In this case, even though one side is the soft elastic member, the outer peripheral portions of the two circular members can be mutually connected at the caulking portion by existence of the support ring. Besides, since the elastic member is welded by pressure in this time, the connecting portion can be fluid-tightly sealed. Fluid-tightness in this case includes both liquid-tightness and air-tightness.

Further, even if said two cylindrical members are an elastic membrane and a bottom member made from resin composing a valve assembly in the anti-vibration device having an orifice passage freely opened and closed and they are the devices forming a negative pressure chamber between the elastic membrane and the bottom member, since a bent portion of the ring caulking member is formed sharply and accurately, each outer peripheral portion can be connected air-tightly and such an anti-vibration device can be assembled advantageously.

According to the third embodiment of the present invention, there is provided a manufacturing process of a liquid filled anti-vibration device disposed between a source of vibration and a vibration receiving portion with the aim of an isolating the vibration, comprising an elastic member shaped partly cylindrical and provided with one end opened and a concave portion inside thereof, a diaphragm closing the opened portion of the concave and forming a liquid chamber filled with liquid inside thereof, a partitioning member dividing the liquid chamber to a main liquid chamber and sub liquid chamber, an orifice passage communicating between the main liquid chamber and sub liquid chamber and one end of a cylindrical metal member provided to cover a cylindrical portion of the elastic member connecting by caulking with an outer peripheral portion of the diaphragm, wherein the process comprises the steps of, immersing the elastic member and the diaphragm in a liquid bath, securing an end portion of a cylindrical metal member of the elastic member and the diaphragm to fit respectively on a jig so as to be filled with a specified volume of the liquid in said liquid chamber, caulking temporarily an apex portion of the cylindrical metal member by pushing down it down partly from the right and left direction in the,state of the elastic member and the diaphragm is secured to the jig as it is, and thereafter, caulking formally the end portion of the cylindrical metal member and the outer peripheral portion of the diaphragm after taking them outside of the liquid bath.

When using such a process, the cylindrical metal member of the elastic member and the diaphragm can be connected by temporarily caulking in the state of being secured to the jig used when charging the filling liquid in the liquid bath. After taken out of the liquid bath in the state of the temporary caulking, they can be caulked formally.

Therefore, since the same seal performance as a state being in the liquid bath and being attached to the jig is assured, a treating performance in the outside of the liquid bath is remarkably improved compared with the former, and as a result of it, processing efficiency can be also remarkably improved.

Moreover, since a roll caulking and other known caulking method can be properly adopted as a formal caulking, the degree of freedom of the processing can be increased.

According to the fourth embodiment of the present invention, there is provided a manufacturing process of a liquid sealed anti-vibration device disposed between a source of vibration and an vibration receiving portion with an aim of isolating the vibration, comprising, an elastic member having one end opened concave portion, a diaphragm closing the opened portion of the concave portion and provided to form a liquid chamber inside where liquid is filled, a partitioning member dividing the liquid chamber to a main liquid chamber and a sub liquid chamber and an orifice passage communicating the main liquid chamber and the sub liquid chamber. The process includes the steps of, making an end portion of a cylindrical metal member provided on a peripheral portion of said elastic member to be a connecting portion fixing by caulking said partitioning member and the diaphragm, charging liquid into the main fluid chamber while admitting in liquid in the state of housing the partitioning member inside the cylindrical metal member end portion, controlling the liquid volume closed inside to be a specified value while controlling the deforming value of the diaphragm piled on the partitioning member, and connecting the partitioning member, the diaphragm and the elastic member by caulking an end portion of the cylindrical metal member.

When using such a process, since the inside closed liquid volume is controlled while changing the deforming value of the diaphragm before fixing by caulking and when the liquid volume come up to the specified value, the end portion of the cylindrical metal member is caulked with the partitioning member and the diaphragm, the filled liquid volume can be controlled to be the accurate value before caulking.

Therefore, since it does not occur that a poor fluid pressure is found by the measurement after caulking for the first time, the products can be maintained at a high level quality and a yield rate can be remarkably improved.

Further, if the deformation of the diaphragm is adapted to be performed by a control member to control from outside of the liquid bath, since a controlling operation become easy and the liquid pressure can be measured directly by means of the controlling member, controlling of the liquid pressure becomes accurate and a whole parts checking is made possible.

Moreover, said controlling member can be constructed to form the deforming space of the diaphragm and to be inserted to move freely from a control hole formed in a part of a cup member caulked together with the diaphragm as a part of the second mounting member. When constructed as above mentioned, the controlling operation of the diaphragm by the controlling member can be easily performed an atmosphere opening hole provided in advance in the cup member can be utilized for the control hole and in such a case, a particular construction for controlling can be needless in the anti-vibration device side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description description given hereinbelow and the accompanying drawings which are given by way of illustration only, and thus are not limitative of the present invention, and wherein:

FIGS. 1 to 16 are views according to the first embodiment, in which:

FIG. 1 is a full sectional view along a principal input direction of vibration in a liquid sealed mount constructed as an engine mount for an automobile (a sectional view taken along the line 1—1 of FIG. 2);

FIG. 2 is a plan view thereof;

FIG. 3 is a plan view of a pivot plate;

FIG. 4 is a plan view relating to a single body of an outer cylindrical member;

FIG. 5 is a cross sectional view taken along the line 5—5 of FIG. 4;

FIG. 6 is a view showing a bead portion from an arrow A direction in FIG. 4;

FIG. 7 is a sectional view thereof (a sectional view taken along the line 7—7 of FIG. 4);

FIG. 8 is a plan view showing a single body of the outer cylindrical member before forming of a stopper receiving portion;

FIG. 9 is a view taken along the line 9—9 of FIG. 8;

FIG. 10 is a view explaining a manufacturing process to process the stopper receiving portion by caulking;

FIGS. 11 to 13 are views respectively similar to FIG. 10;

FIG. 14 is a view showing a securing process of the pivot plate;

FIG. 15 and FIG. 16 are views respectively similar to FIG. 14;

FIGS. 23 to 27 are views according to the second embodiment, in which:

FIG. 23 is a full sectional view of a finished product;

FIG. 24 is a view showing an assembling method;

FIG. 25 is a partial cross sectional view showing a temporary caulking process;

FIG. 26 is a principle view in a plan side thereof;

FIG. 27 is a view showing a controlling method of filling liquid.

DETAILED DESCRIPTION OF THE PREFERRED EMBODIMENT

Figure 1:
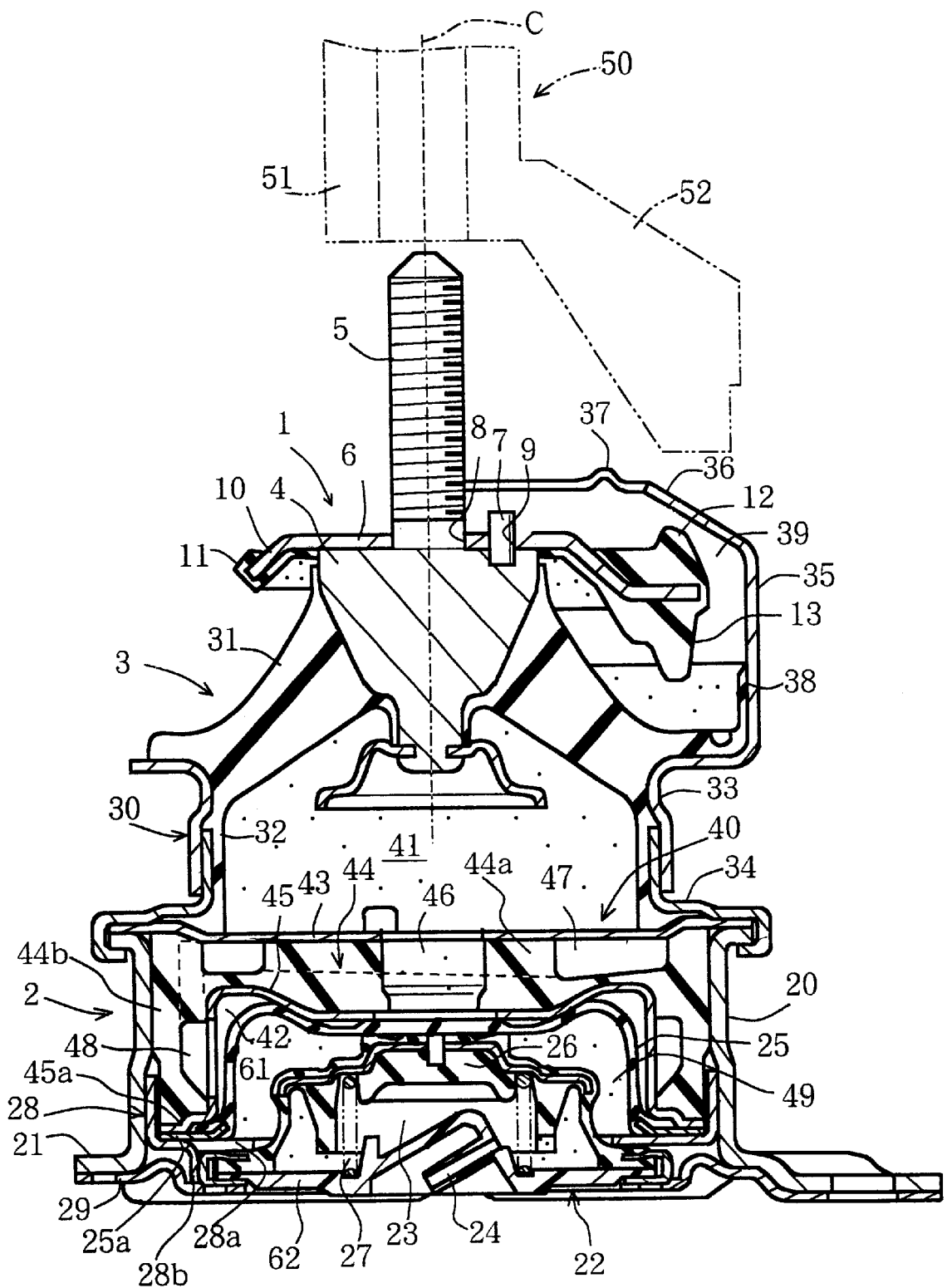
Figure 2:
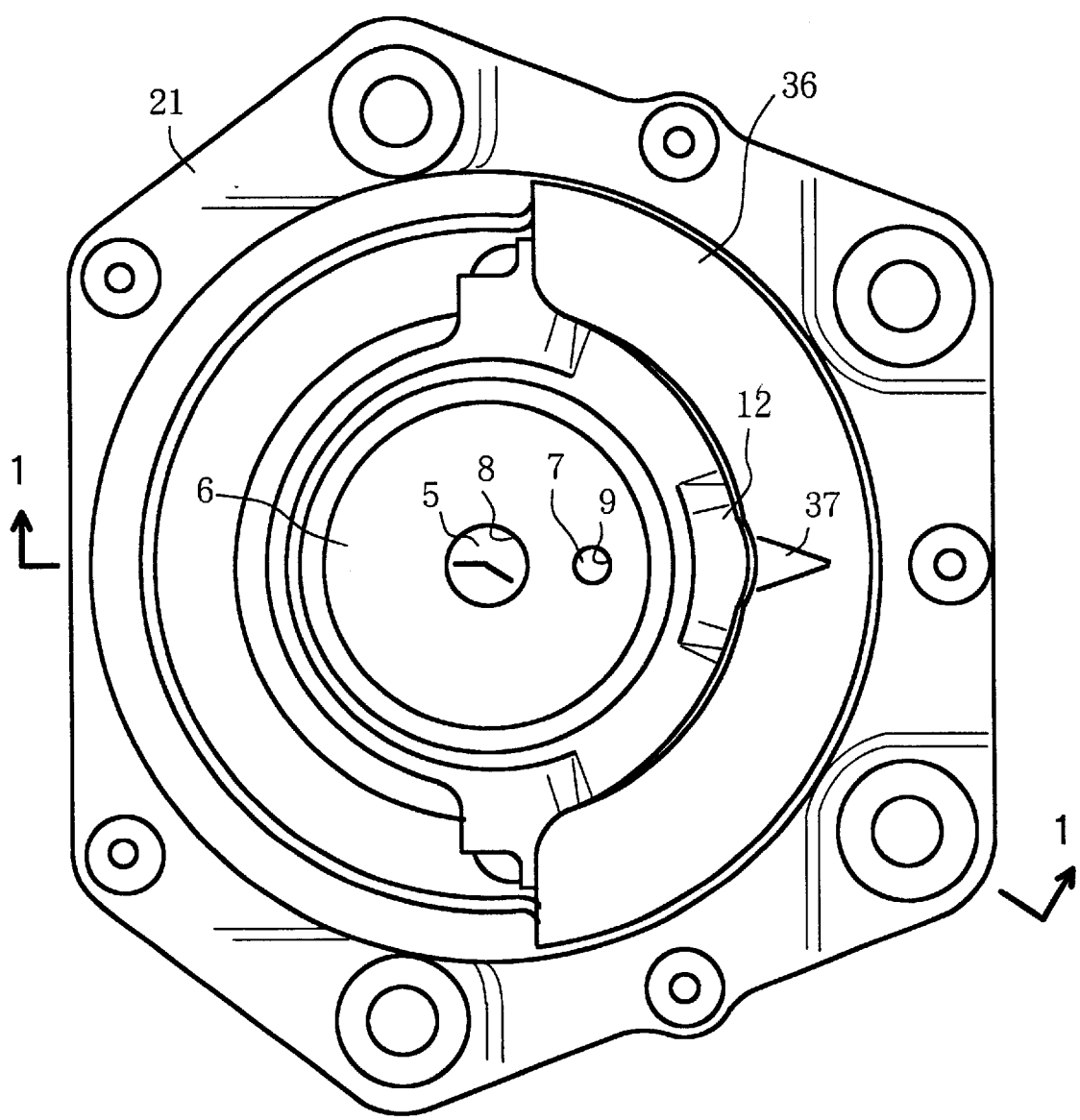

Referring to the drawings, an first embodiment of the present invention is shown. According to FIG. 1 to FIG. 3, a general construction of a liquid sealed anti-vibration mount is described. As shown in FIG. 1, this liquid sealed anti-vibration mount comprises a first mounting member 1 attached to an engine side as a vibration source, a second mounting member 2 attached to a body side as a vibration receiving side and an elastic member 3 connecting between the first mounting member 1 and second mounting member 2.

The first mounting member 1 possesses a main body 4 shaped in a substantially inversed cone, a mounting shaft 5 shaped in a bolt projecting from a center thereof and a pivot plate 6 mounted to pivot freely around the mounting shaft 5, while the pivot plate 6 is limited to pivot by a pin 7 protruding from the main body 4.

Figure 3:
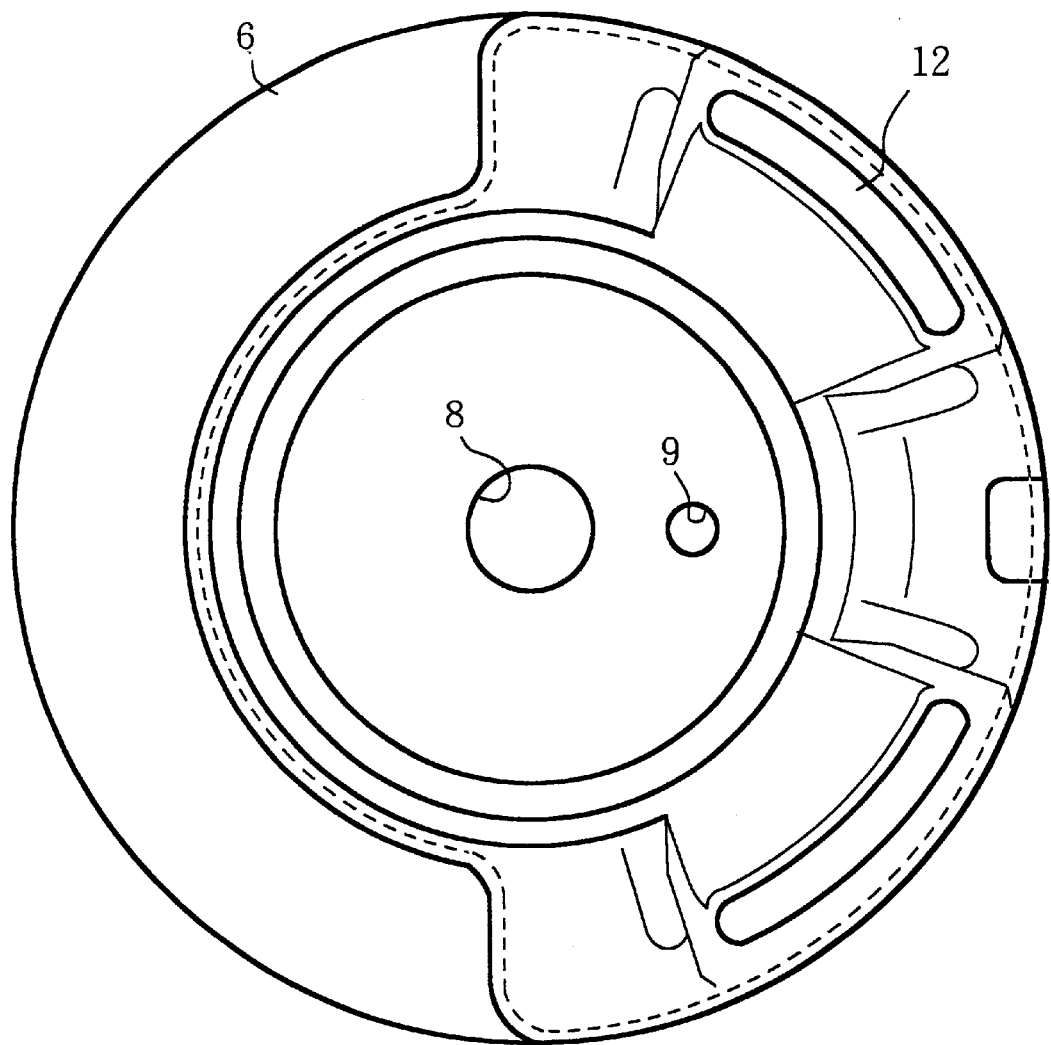
Figure 4:
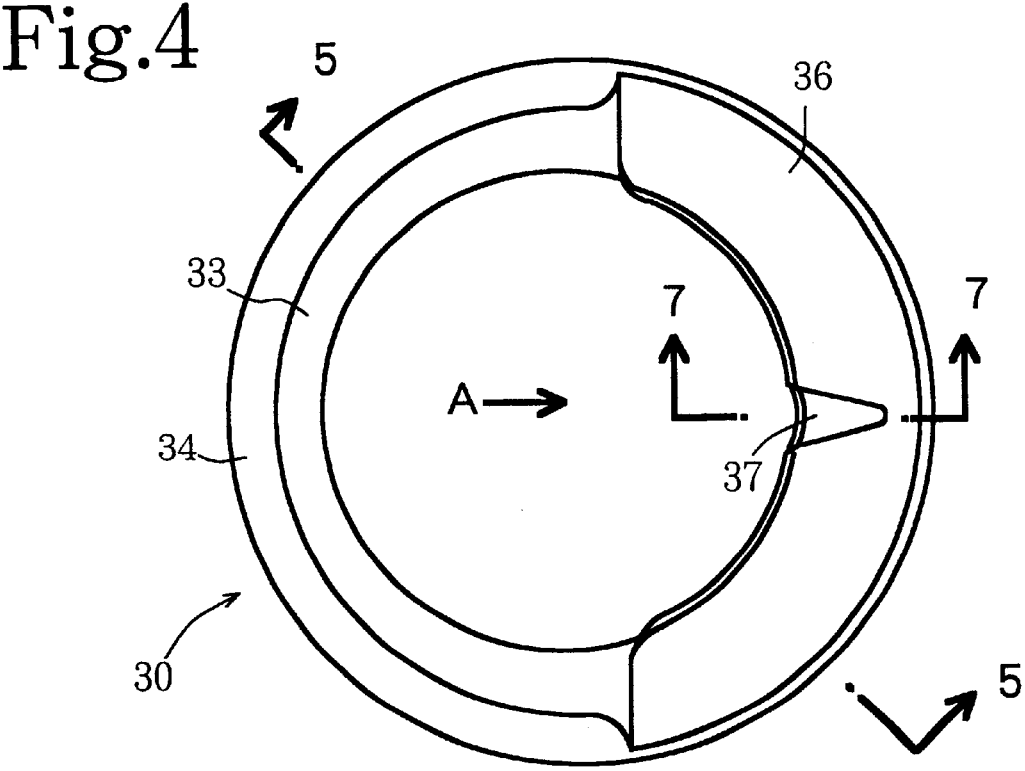

As shown in FIG. 3, the pivot plate 6 possesses a center hole 8 fitting with the mounting shaft 5 at a center and a pin hole 9 fitting with the pin 7 at an outer part thereof in a radial direction. A peripheral portion 10 thereof is inclined as an umbrella shape and is covered with an elastic layer 11 such as rubber, while about a half round portion thereof extends rather longer to a radially outer direction and a first stopper projection 12 and a second stopper projection 13 is formed integrally with the elastic layer 11 on both sides of the extending portion and project upward and downward in inverse direction.

The second mounting member 2 is provided with a metal made cylindrical portion 20 and an upper portion thereof is connected by caulking with a lower end portion of an outer cylindrical portion 30 (shown hereinafter) supporting the elastic member and an inside partitioning member 40.

A lower portion of the cylindrical portion 20 is formed as a bracket portion 21 for the body side mounting projected outwardly in a radial direction and in a lower opening portion of the cylindrical portion 20 which is a center portion side of the bracket portion 21, a valve assembly body 22 is secured and accommodated in a inner space of the cylindrical portion 20.

A negative pressure chamber 23 is formed inside the valve assembly 22 and is connected to a negative pressure source (not shown) through a slant nozzle 24 provided at a center of a bottom portion.

The partitioning member 40 and the valve assembly 22 housed beforehand inside the space of the cylindrical portion 20 runs along an inner wall thereof and is separated by a diaphragm 25 arranged along the partitioning member 40.

An upper portion of the valve assembly 22 possesses an elastic wall portion, which is elastically freely deformable, and expands and contracts via negative pressure control for the negative pressure chamber 23. A part thereof is formed to be a valve 26 and is adapted to press a center portion of the diaphragm 25 against a center portion of the partitioning member 40.

This valve 26 is forced to move upward by a spring 27 disposed in the negative pressure chamber 23 and is adapted to move downwardly against a force of spring 27 when the negative pressure is applied to the negative pressure chamber The partitioning member 40 is formed between an inner space of the elastic member 3 and the diaphragm 25 and is adapted to be a member dividing a liquid chamber filled with non-compressible liquid to a main liquid chamber 41 of the elastic member side and a sub liquid chamber 42 of the diaphragm 25 side. Which comprises a circular plate 43, a cup member 44 made from rubber or the like and a supporting plate 45.

The cup member 44 is formed in a substantially cup shape opened downwardly and is a thick dimension member formed with rubber or the appropriate resin material, which is formed integrally with a transverse portion 44a substantially parallel to the cylindrical plate 43 and a side wall portion 44b running along the inner wall of the cylindrical portion 20.

The transverse portion 44a is provided to close the main liquid chamber 41 with the circular plate 43 and a first orifice passage 46 is formed to pass through in a center portion thereof. In a thickness of an outer peripheral portion surrounding the first orifice passage 46, a second orifice passage 47 is formed.

The second orifice passage 47 is formed in a substantially spiral shape and a lower portion thereof is formed in a thickness of the side wall portion 44b. An opening portion 48 is communicated to the sub liquid chamber 42 formed between the supporting plate 45 and the diaphragm 25 disposed inside thereof.

A flange portion 45a is formed on a lower portion of the supporting plate 45 and a flange portion 25a is integrated with an outer peripheral end portion of the diaphragm 25 and are mutually superposed and sandwiched between a horizontally projecting member 28a of a press fit member 28 press fitted inside the cylindrical member 20 and an end face of the side wall portion 44b of the substantially cup shaped member 44.

A part of the press fit member 28 is adapted to be a side portion 28b extending substantially in parallel to an inner wall of the cylindrical portion 20 and is adapted to fix an outer peripheral portion (mentioned hereinafter) of the valve assembly 22 with a pressing plate 29 integrated with the bracket portion 21 and said horizontally projecting portion 28a.

The valve assembly 22 is accommodated in a space 49 located at an inverse side of the sub liquid chamber 42 surrounded with the diaphragm 25 and is a hollow member in which the negative pressure chamber 23 is formed inside thereof with the valve 26, an elastic membrane 61 expanding uniformly to the peripheral thereof and a bottom member 62 integrated air-tightly with an outer portion thereof.

In a center portion of the bottom, member 62, the slant nozzle 24 is provided and connected to the not shown negative pressure source. When the negative pressure is applied into, the negative pressure chamber 23, the valve 26 is adapted to be brought down against the spring 27 forcing to usually push up the vale 26 provided inside the negative pressure chamber 23.

When the valve 26 is brought down, since the diaphragm causes the sub liquid chamber 42 side opening of the first orifice passage 46 to open, the main liquid chamber 6 and sub liquid chamber 42 are communicated. When the valve 26 is pushed up by the spring 36 with the stopping of the negative pressure action to the negative pressure chamber 23, the diaphragm 25 is adapted to interrupt the communication while the diaphragm 25 covers said opening of the first orifice passage 46.

The first orifice passage 46 is usually closed by the valve 26 via the diaphragm 25 and is opened only when an engine is in an idling state. The second orifice-passage 47 is adapted to communicate always the main liquid chamber 41 with sub liquid chamber 42.

The elastic member 3 is made from rubber or other suitable elastomer together with the first mounting member 1 and the outer cylindrical member 30, which is formed together with a hollow conical member 31 communicates in tapered shape the first mounting portion and an upper portion of the outer cylindrical member 30 and a cylindrical member 32 formed inside the outer cylindrical member 30.

Figure 5:
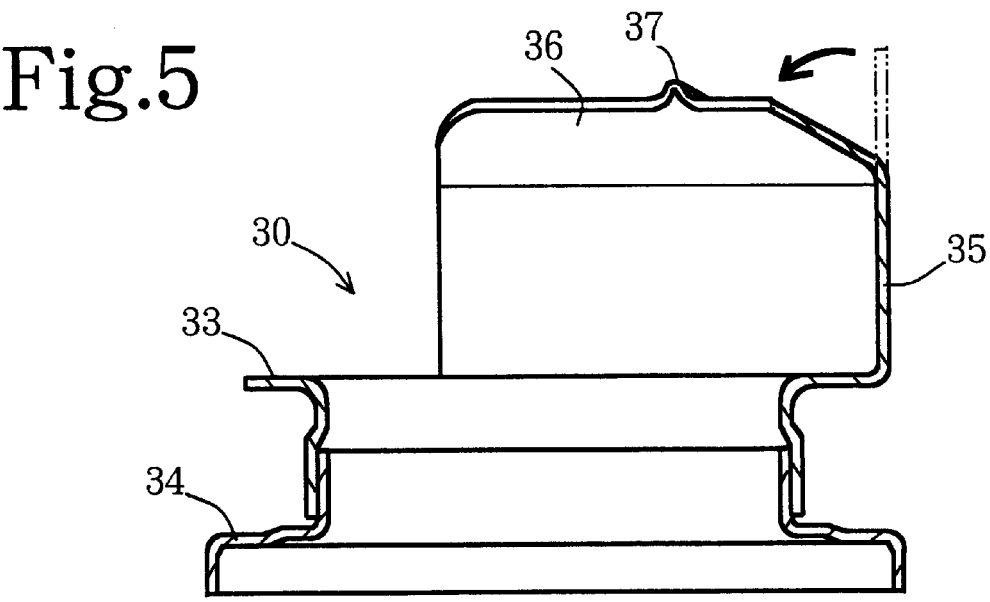
Figure 6:
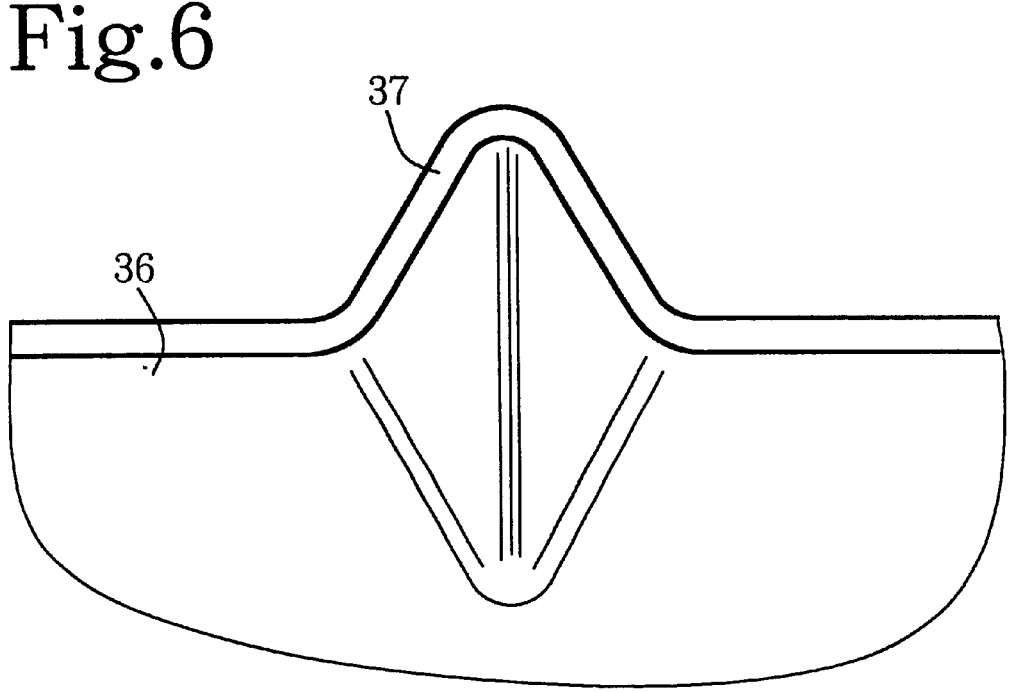
Figure 7:
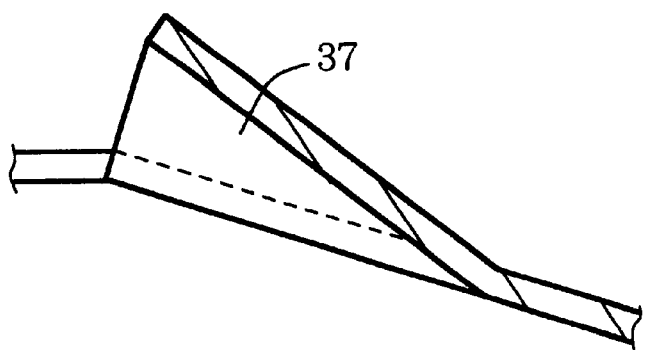

As shown in FIGS. 4 to 7, the outer cylindrical member 30 is formed together by press fitting mutually a lower end portion of an upper portion 33 and an upper end portion of a lower portion 34 (see FIG. 5). A stopper metal member 35 is provided over about a half round part of the upper portion 33. This member is a wall portion formed in a half arcuate shape projecting together upwardly and covering about a half round side of the hollow conical member 31 (see FIG. 1).

On an apex portion of the stopper metal member 35, a stopper receiving portion 36 is formed that is substantially parallel to an outer slope of the hollow conical member 31 and a bead portion 37 projecting upwardly in chevron shape is formed on a part thereof (see FIG. 1).

Figure 8:
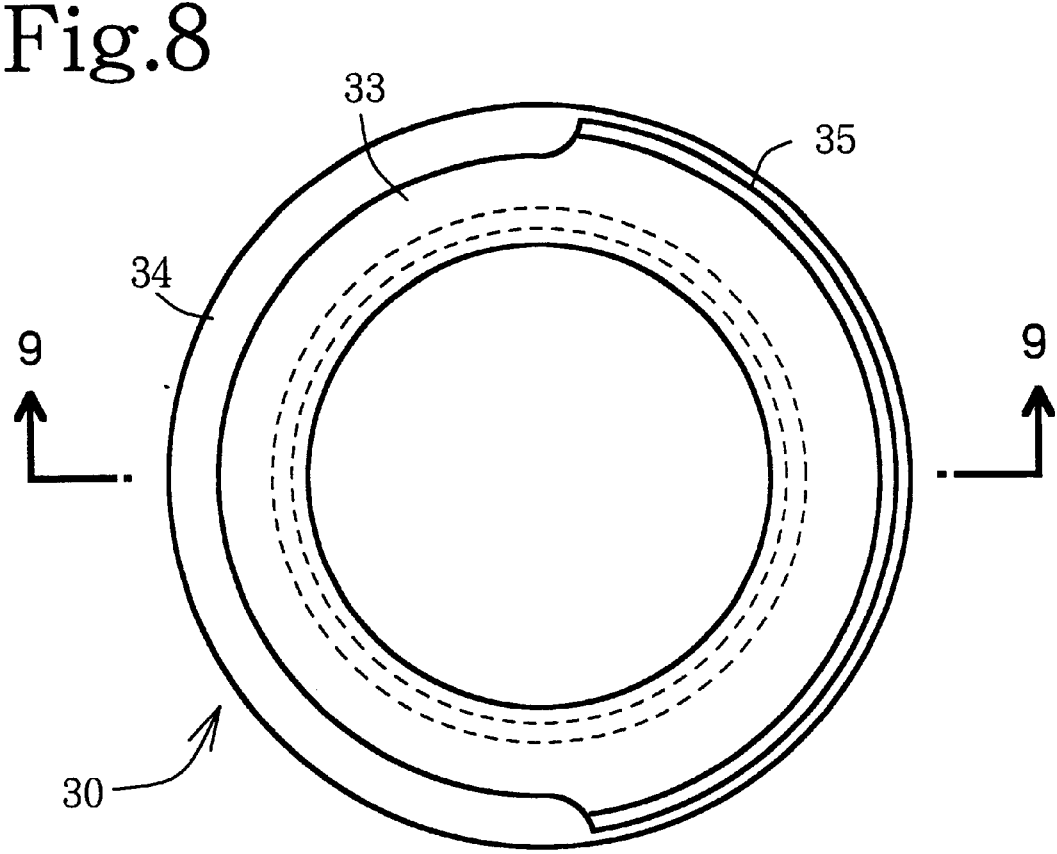
Figure 9:
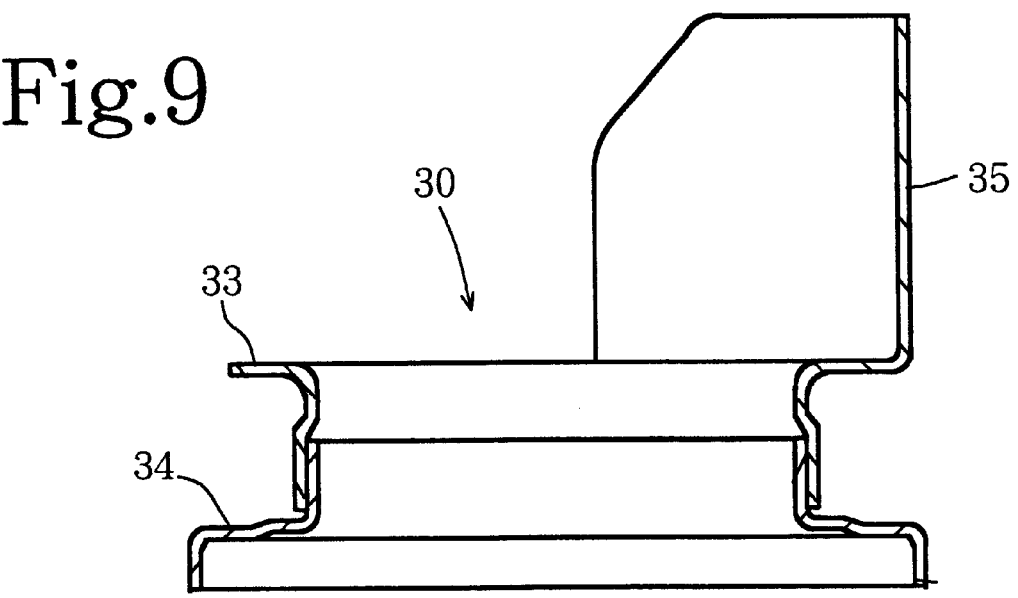

Next, a forming process of the stopper receiving portion 36 is described. As apparent from FIGS. 8 and 9, the stopper metal member 35 before forming of the stopper receiving portion is adapted to be substantially parallel to a center line of the liquid sealed mount.

Figure 10:
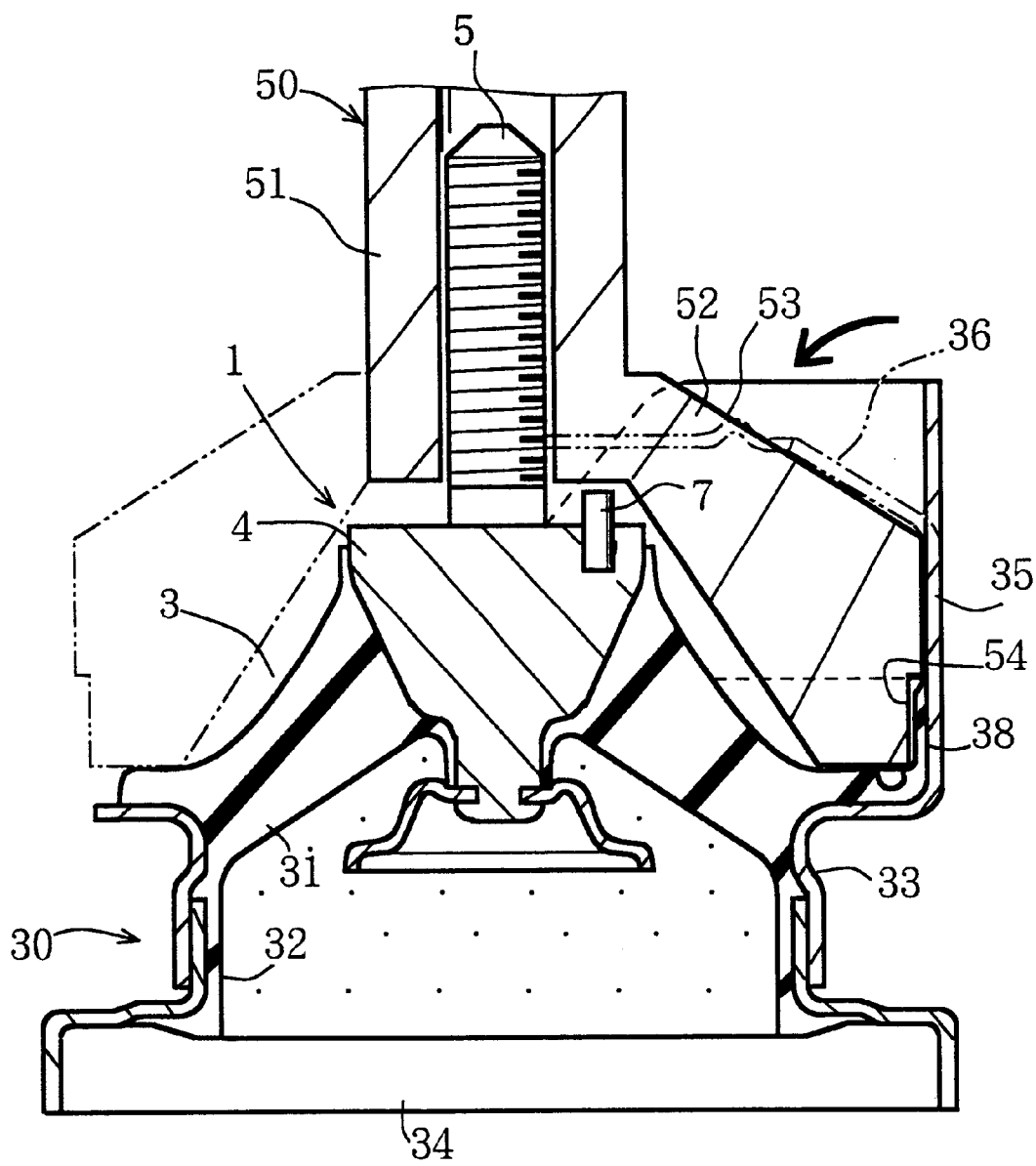

FIGS. 10 to 13 are the drawings to show a caulking process of the stopper receiving member 36. As shown in FIG. 10, a jig 50 for caulking is provided integrally with a fitting shaft 51 to fit with the mounting shaft 5 and a side projecting portion 52 for forming the stopper receiving member 36.

The side projecting portion 52 is provided in substantially a half round shape in plan view for the fitting shaft 51 such as the stopper metal member 35 and a forming surface 53 thereof is adapted to be same slant as the stopper receiving portion 36. On a lower portion of an outer peripheral portion thereof, a cut out portion 54 is provided to skirk a corner rubber 38 formed at a corner portion of the stopper metal member 35 by a part of the hollow conical portion 31.

The fitting shaft 51 of the jig 50 is attached to the mounting shaft 5 and the side projecting member 52 is admitted between an outer surface of the hollow conical member 31 and the stopper metal member 35. In this time, a lower portion of the fitting shaft 51 is abutted on a head portion of the pin 7 and is spaced from a surface of the main body 4 to some degree.

Figure 11:
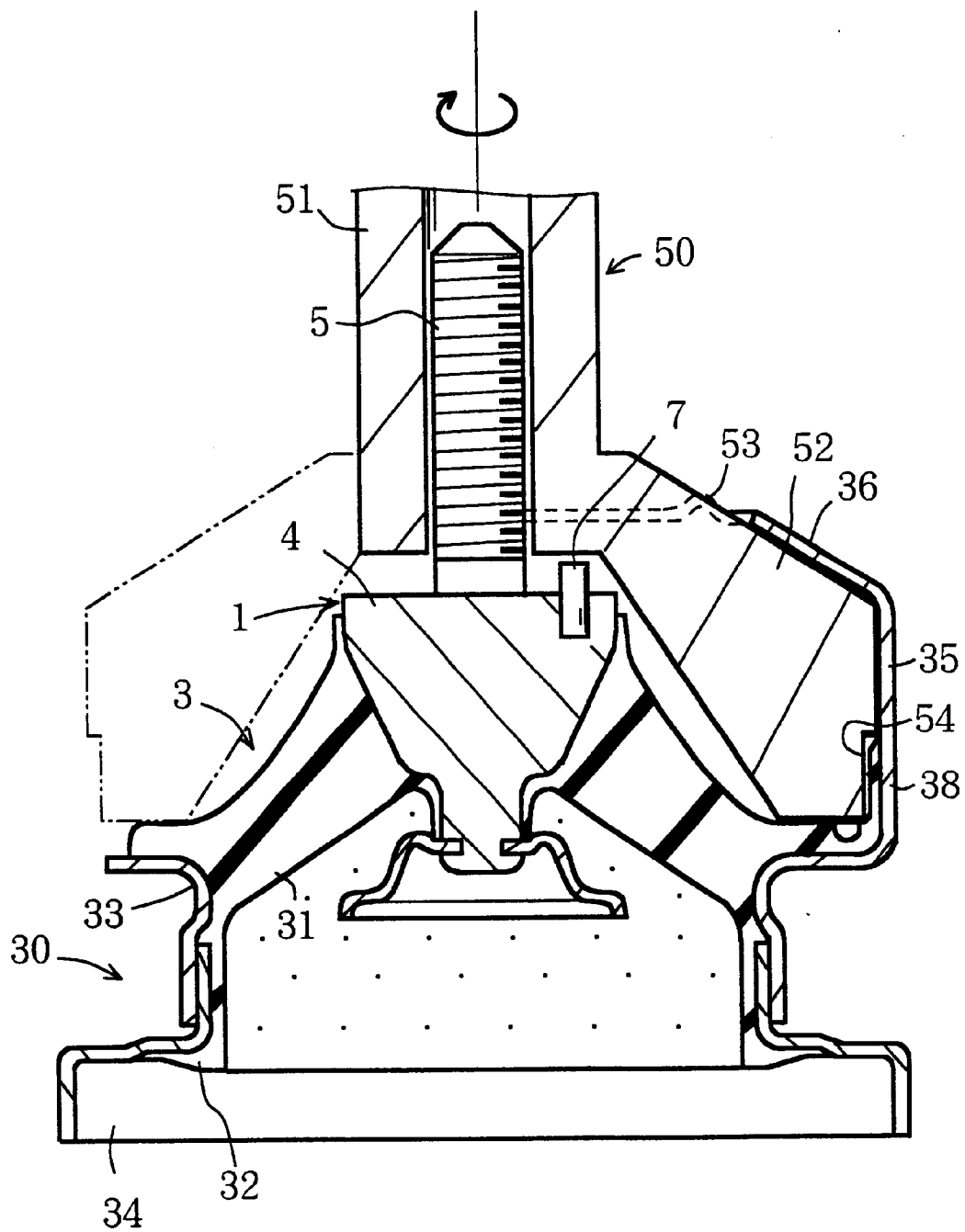
Figure 12:
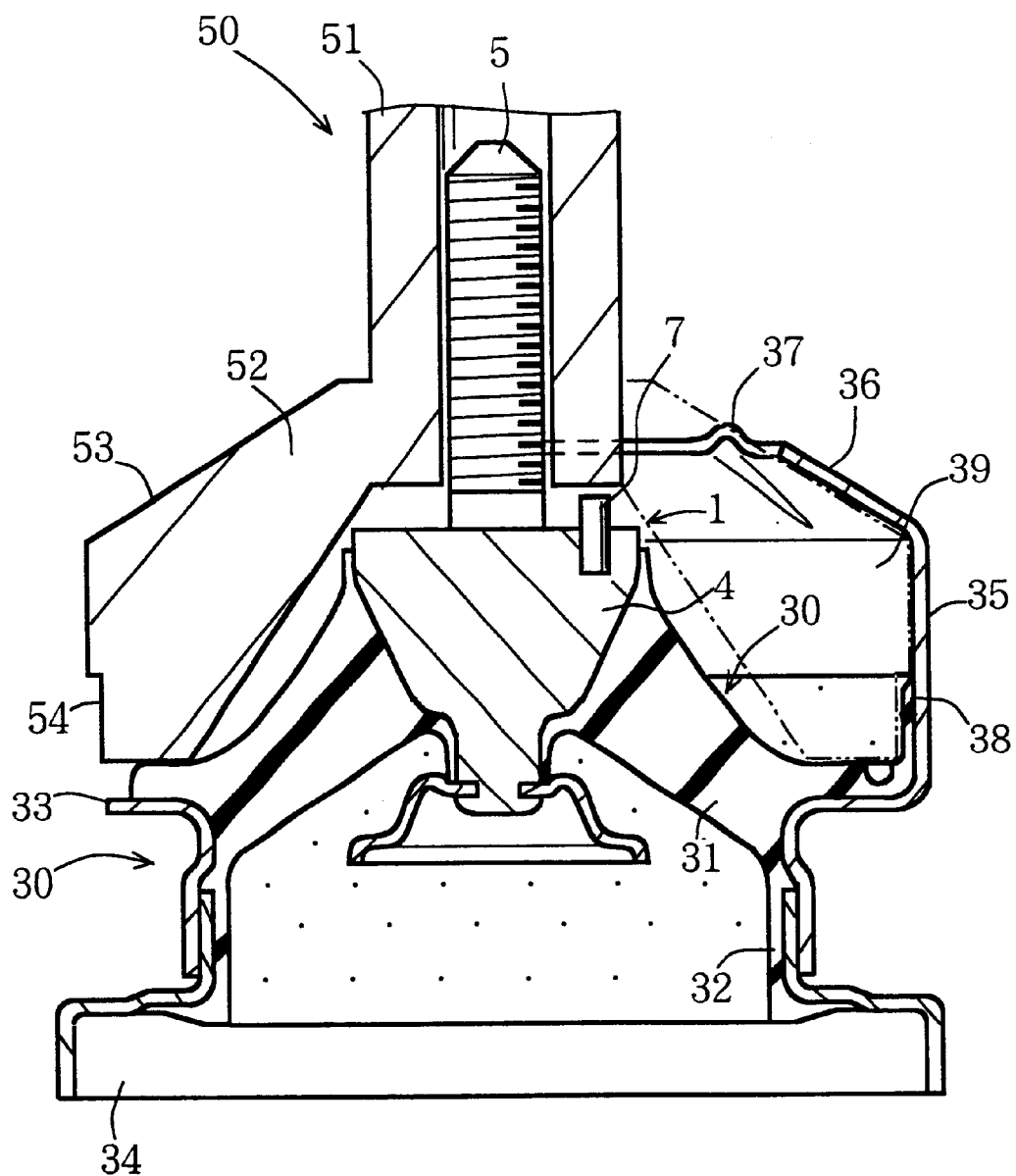

When the upper portion of the stopper metal member 35 is caulked toward the forming surface 53 of the side projecting member 52, the stopper receiving member 36 is formed as shown in FIG. 11. At the same time, as is apparent from FIGS. 6 and 7, the bead portion 37 is formed by the excessive material in a chevron shape.

Figure 13:
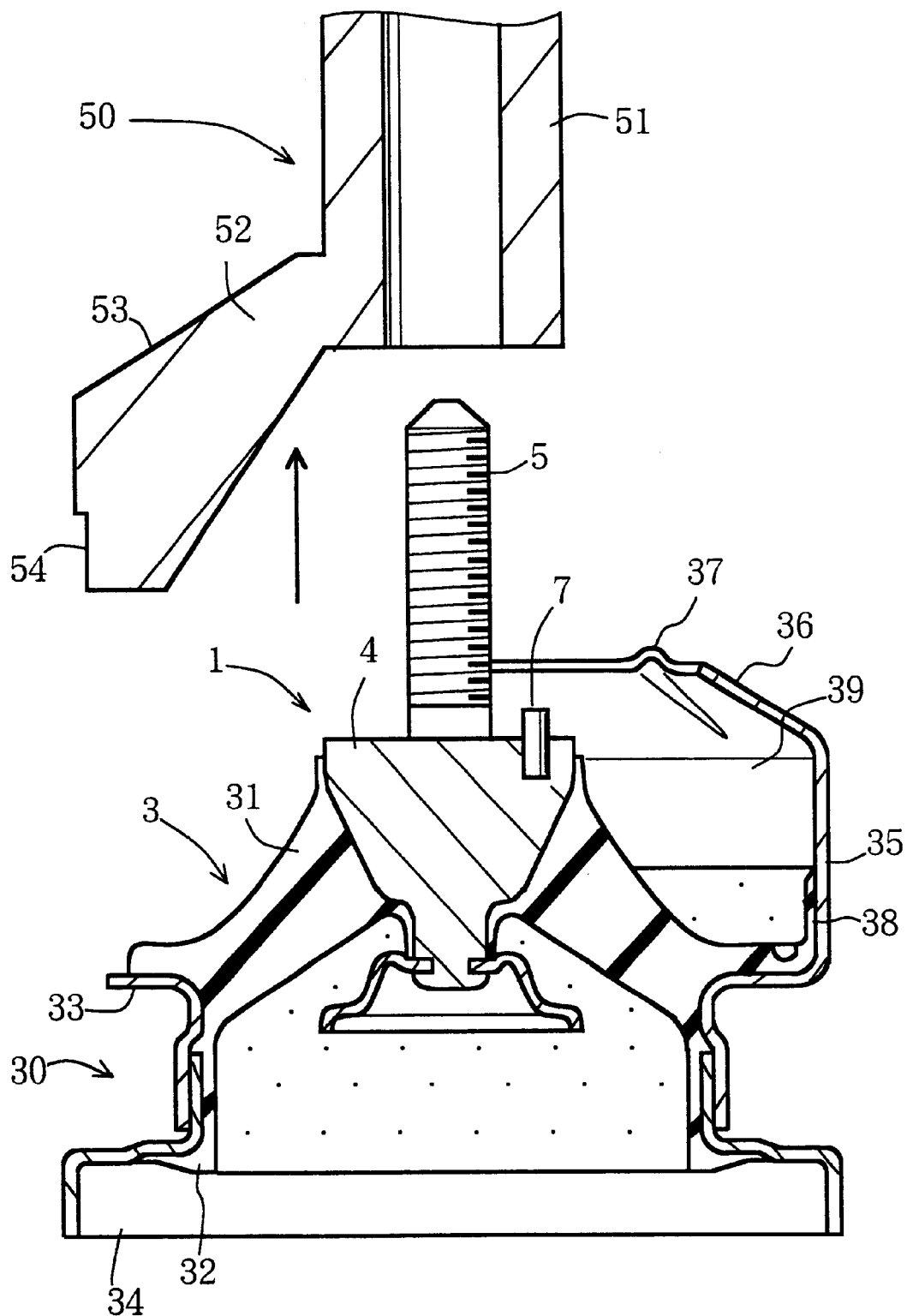

Next, when the jig is rotated about 180 degree around the mounting shaft 5, since the side projecting member 52 is escaped from a stopper space 39 surrounded by the hollow conical member 31, the stopper receiving member 36 and the stopper metal member 35 can be pulled out to a shaft direction of the mounting shaft 5 as shown in FIG. 13.

Figure 14:
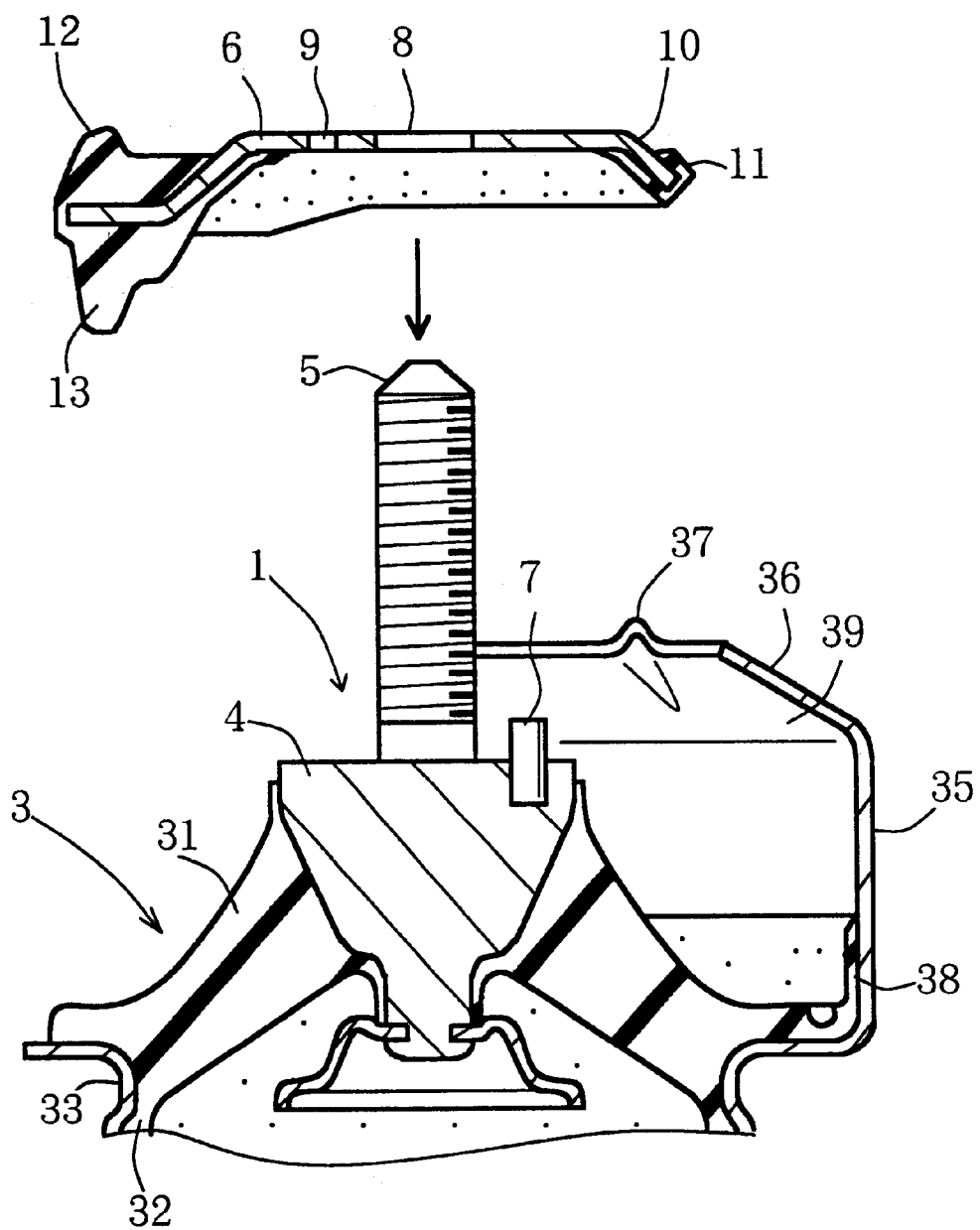
Figure 15:
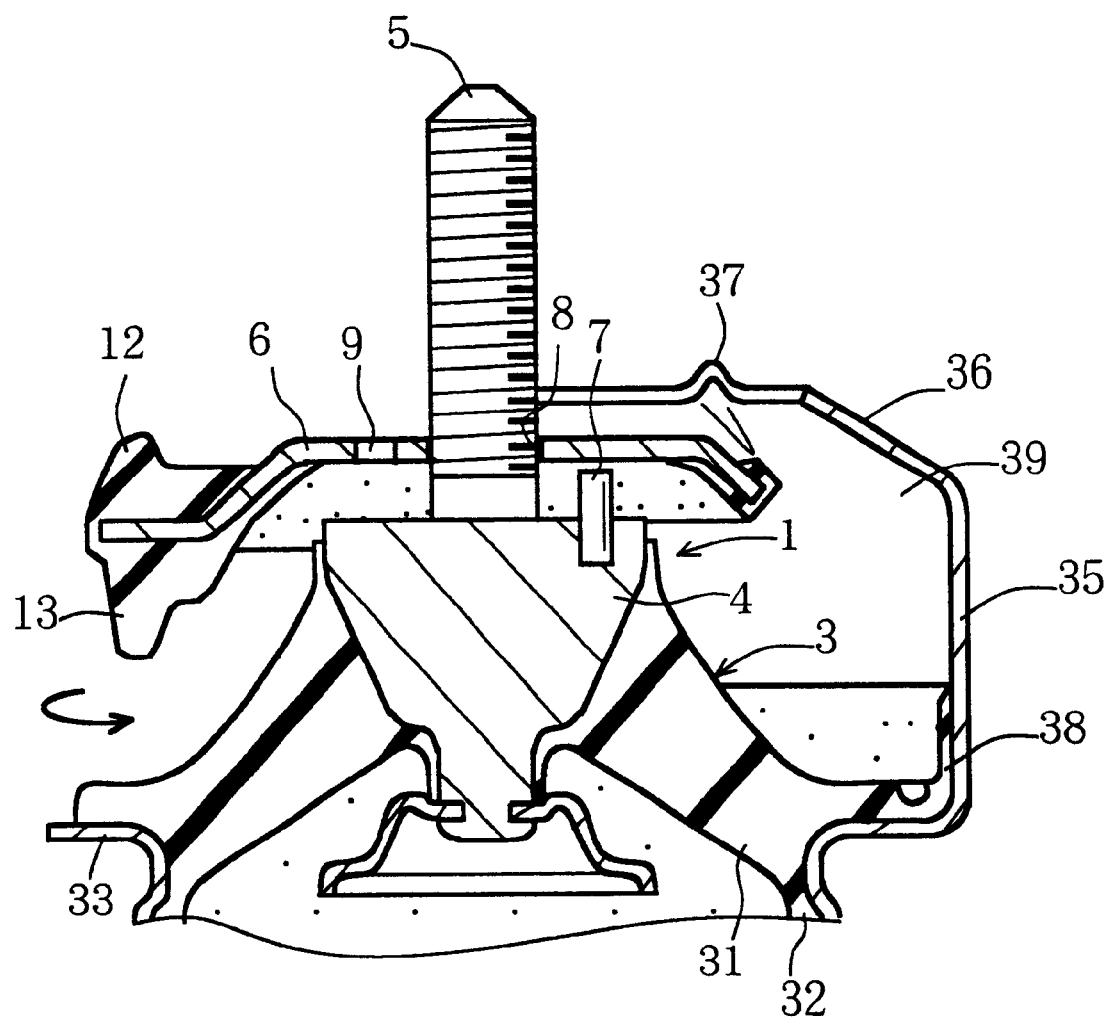
Figure 16:
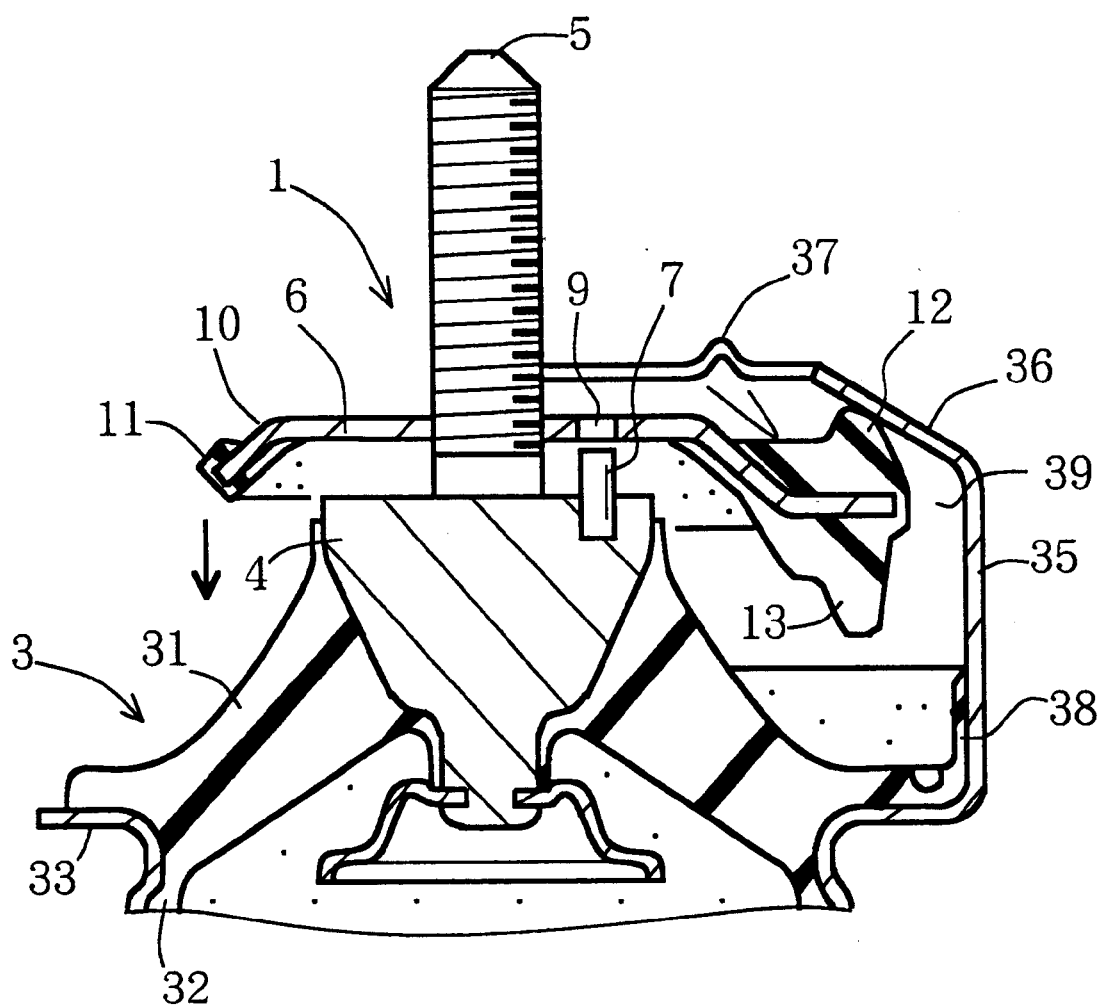

Next, referring to FIGS. 14 to 16 showing a mounting process of the pivot, plate 6, a process to arrange the stopper projections 12, 13 to the stopper space 39 is described. First, FIG. 14, the pivot plate is placed on an upper portion of the main body 4 on which the stopper receiving portion 36 is formed and from which the jig 50 has been removed and a center hole 8 is adapted to coincide with the mounting shaft 5. In FIG. 3, a plan view of the pivot plate 6 is shown.

In this time, the first stopper projection 12 and the second stopper projection 13 are located on sides of the stopper metal member 35 for the mounting shaft 5, namely, on a position not provided with the stopper metal member 35.

In this state, as shown in FIG. 15, the mounting shaft 5 is passed through the center hole 8 of the pivot plate 6 and the pivot plate 6 is adapted to have a space to the Main body 4 by abutting on the head of the pin 7. Next, when the pivot plate 6 is rotated approximately 180 degree about the mounting Shaft 51 as shown in FIG. 16, the first stopper projection 12 and the second stopper projection 13 are admitted to the stopper space 39.

When the pin 7 is fitted to the pin hole 9 in this state, the pivot plate 6 is stopped to rotate at the designated position and the device becomes a finished state in which the first stopper projection 12 and the second stopper projection 13 are fixed inside the stopper space 39.

As stated above, when the stopper metal member 35 is formed on about a half round, after the first mounting member 1 and the second mounting member 2 are integrated with the elastic member 3 by baking or the like, the stopper receiving member 36 can be formed by using the jig 50 having the side projecting member 52 formed in substantially a half round shape, thereafter the jig 50 can be removed by rotating.

Therefore, since the stopper metal member is beforehand integrated with the second mounting member 2 and it becomes possible to process the stopper receiving member 36 after integrating with the elastic member 3, the precision control of the stopper receiving member 36 can be easily achieved.

Further, since the bead portion is formed by utilizing the excessive material generated when the stopper metal member is bent inward and the diameter is reduced, stiffness of the stopper receiving member 36 can be raised by the bead portion 37.

Moreover, since the first stopper projection 12 and the second stopper projection 13 are provided on the half, round portion of the pivot plate 6, the first stopper projection 12 and the second stopper projection 13 can be arranged inside the stopper space 39 by rotating the pivot plate 6 about a half rounds after taking out the jig 50.

Therefore, since it can be managed without disposing beforehand the first stopper projection 12 and the second stopper projection 13 inside the stopper space 39, the processing of the stopper receiving member 36 can not be disturbed.

It will be understood that the present invention is not limited to the embodiments described above and may be modified in many ways. For example, the first and second stopper projections 12, 13 may be either one and a region, in which the stopper projections and the stopper metal member 35 are arranged, may be voluntarily set as ⅓ round, ¼ round or so, as long as not exceeding a half round.

FIGS. 17 to 20 are the drawings showing the construction and the assembly process of the valve assembly. As shown in these drawings, an inner side of a caulking metallic ring member 64 is integrated by insert molding with a thick portion 63 formed on an outer peripheral portion of an elastic membrane member 61. An outer peripheral portion 65 is bent on an outer peripheral member 62a of a bottom member 62 in the state of putting a support ring 66 inside thereof, and the outer peripheral portions 65 and 62a are connected integrally in an airtight by caulking.

The valve 26 and the elastic membrane member 61 are integrated and are adapted to be, as a whole, substantially a cup shape. A deformation interrupting plate 67 is inserted to the valve 26 and the vicinity thereof as a thick top portion of the cup shape to make a contact portion of the valve 26 against the diaphragm 25 to be hard to deform as well as is a receiving portion of the spring 27.

Figure 20:
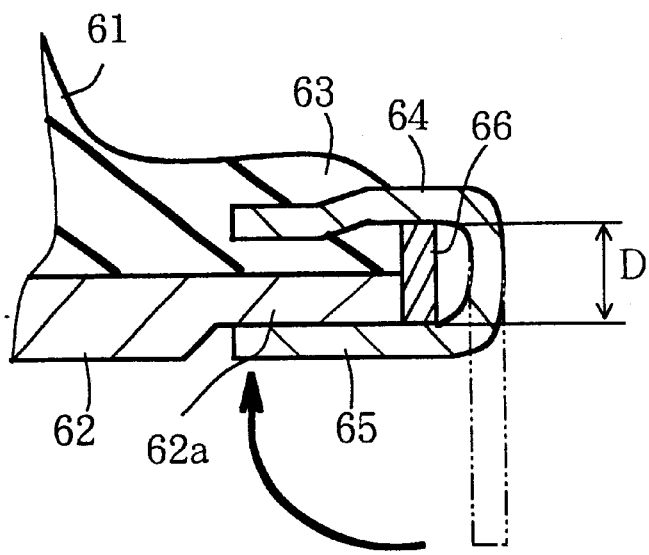
FIG. 20 is an enlarged sectional view showing a connecting portion by caulking of the valve assembly.
Figure 21:
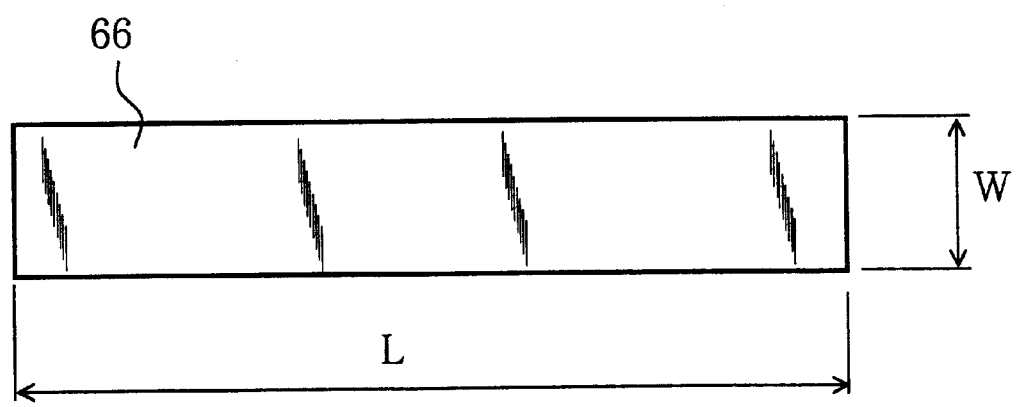
FIG. 21 is a development of a support ring.

FIG. 21 shows a developed shape of a support ring 66. As is apparent from the drawing, a support ring 16 is a strap shaped metallic member. Width W thereof is same degree as an interval D (FIG. 20) between the inserted portion thereof and the outer peripheral portion 65 in the time of, caulking of the ring caulking member 64, and the length L is of same degree as a length to be possible to wind each outer end of the thick portion 63 of the elastic membrane 61 and the outer peripheral portion 62a of the bottom member 62.

Figure 17:
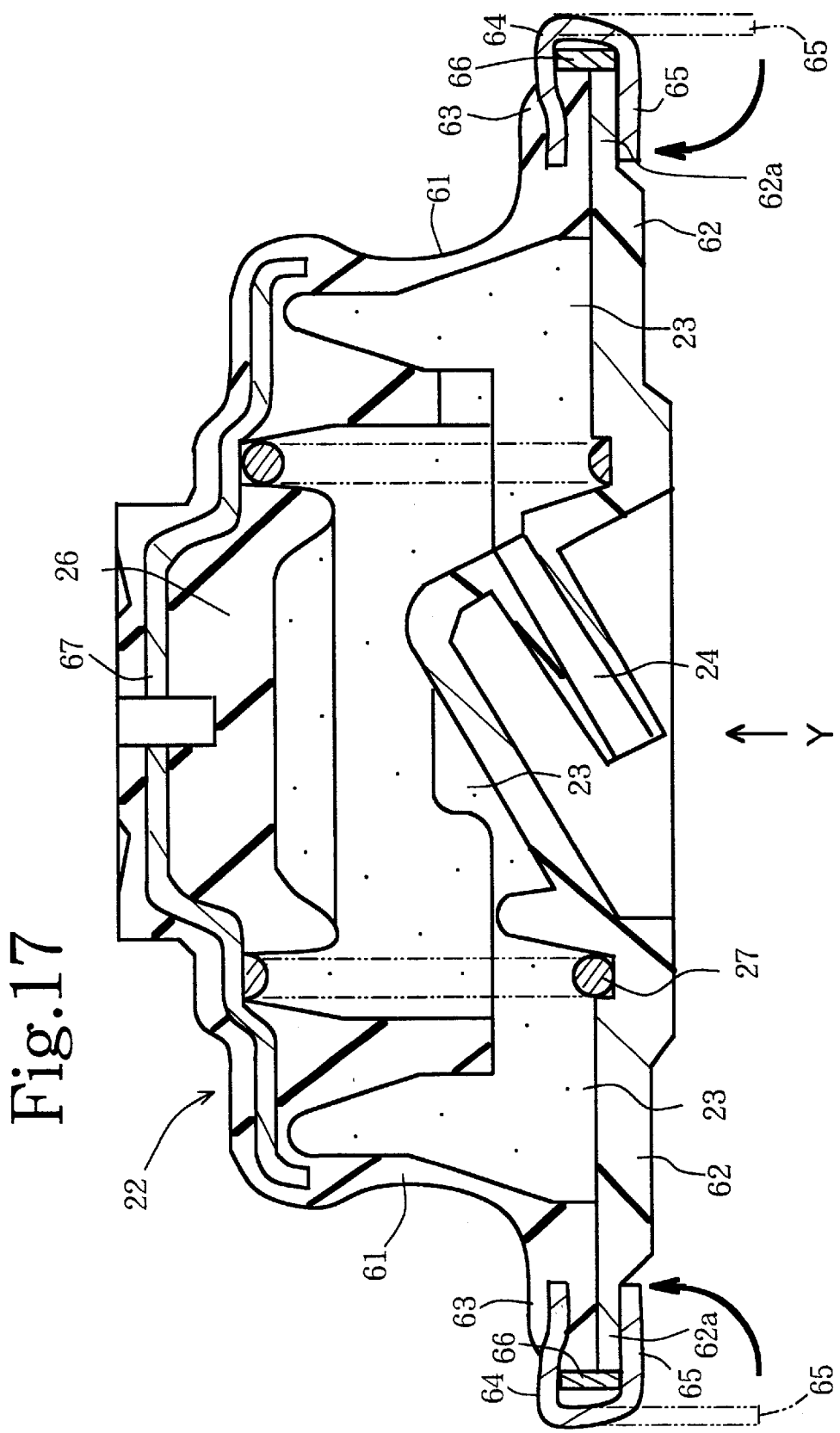
FIG. 17 is a full sectional view of a valve assembly.
Figure 18:
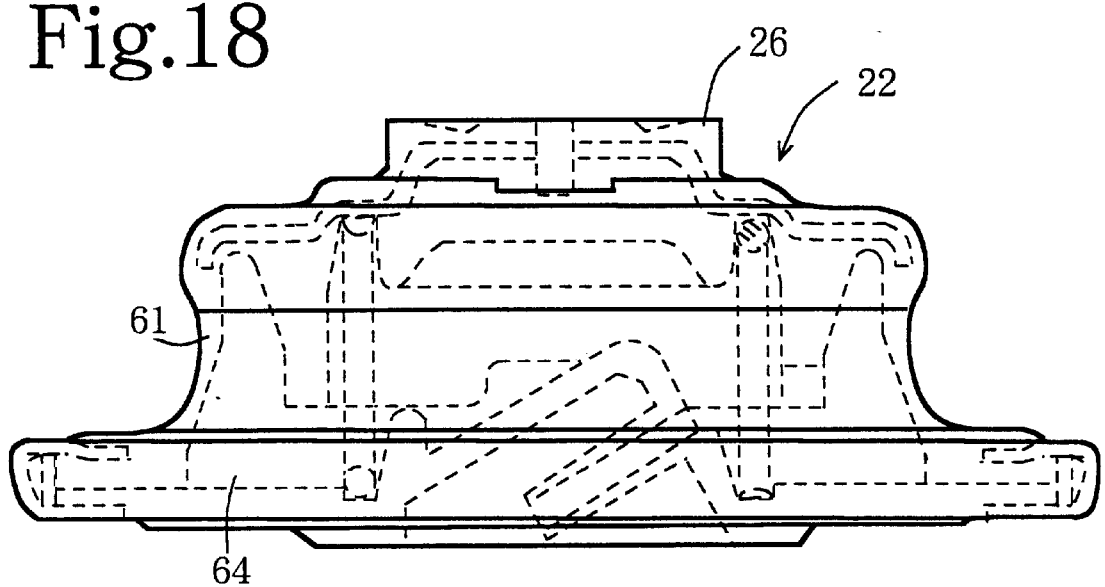
FIG. 18 is a side elevation view of the valve assembly.
Figure 19:
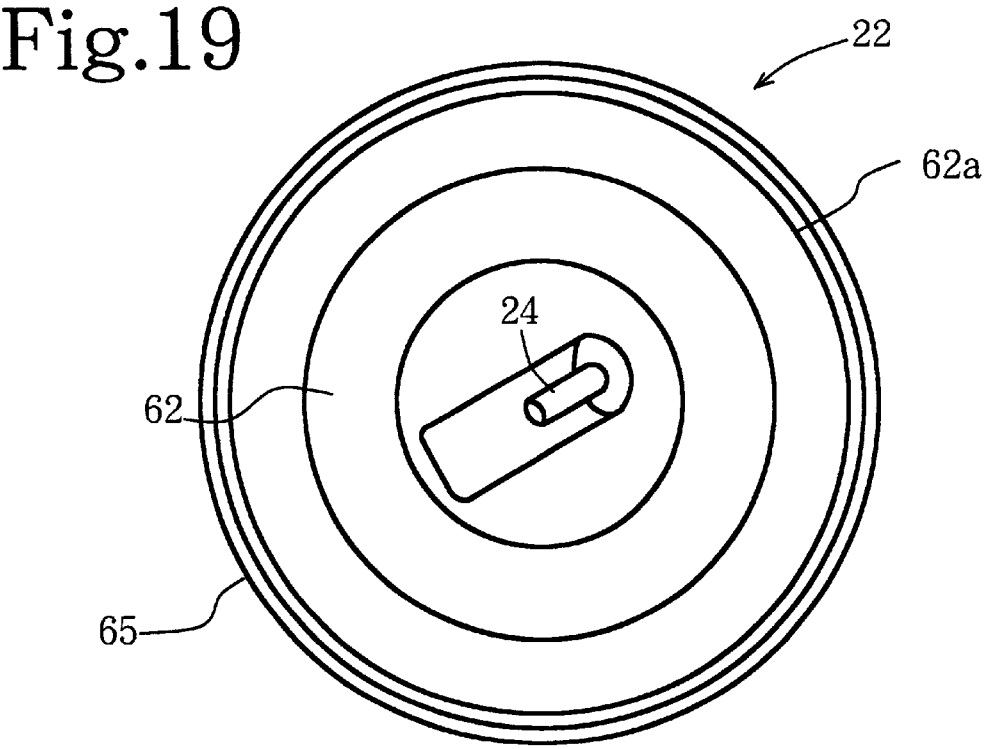
FIG. 19 is a bottom plan view of the valve assembly.
Figure 22:
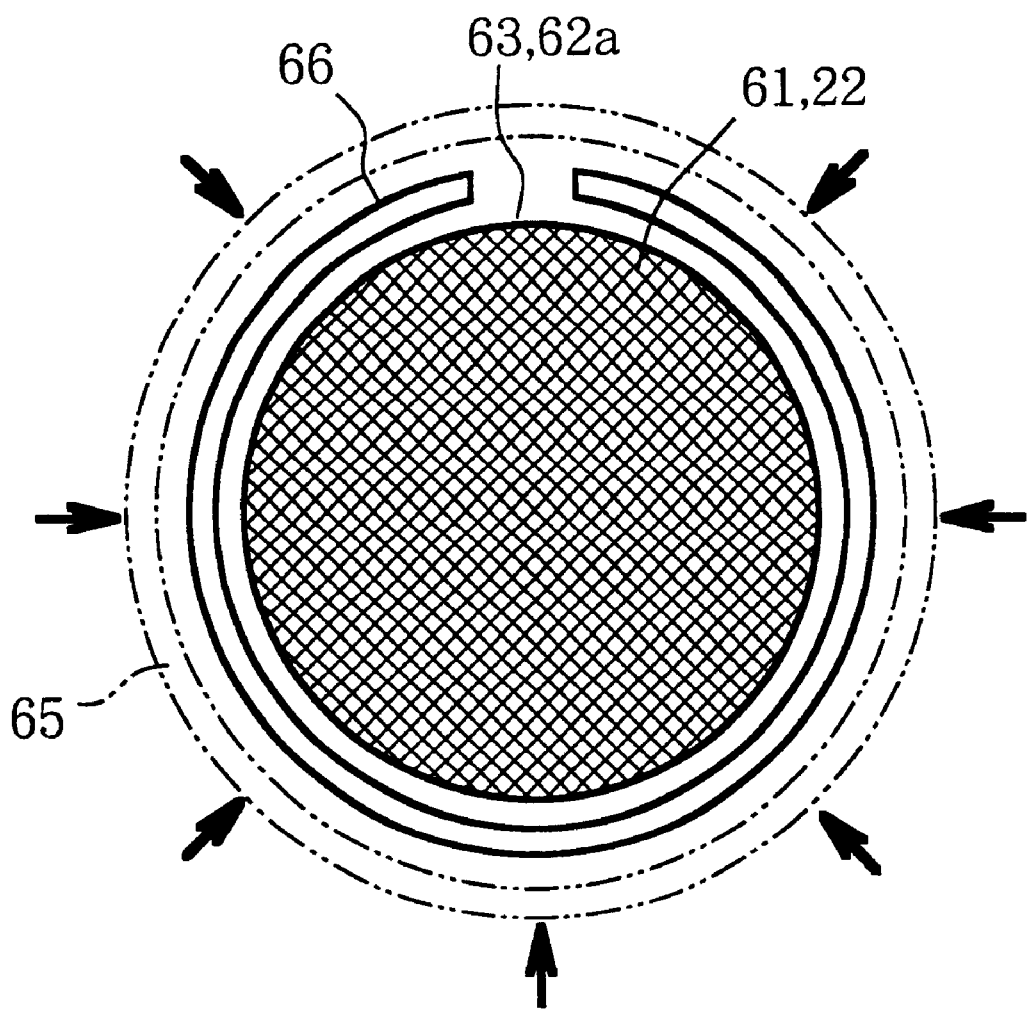
FIG. 22 is a view showing a principle for using of the suport ring.
Figure 23:
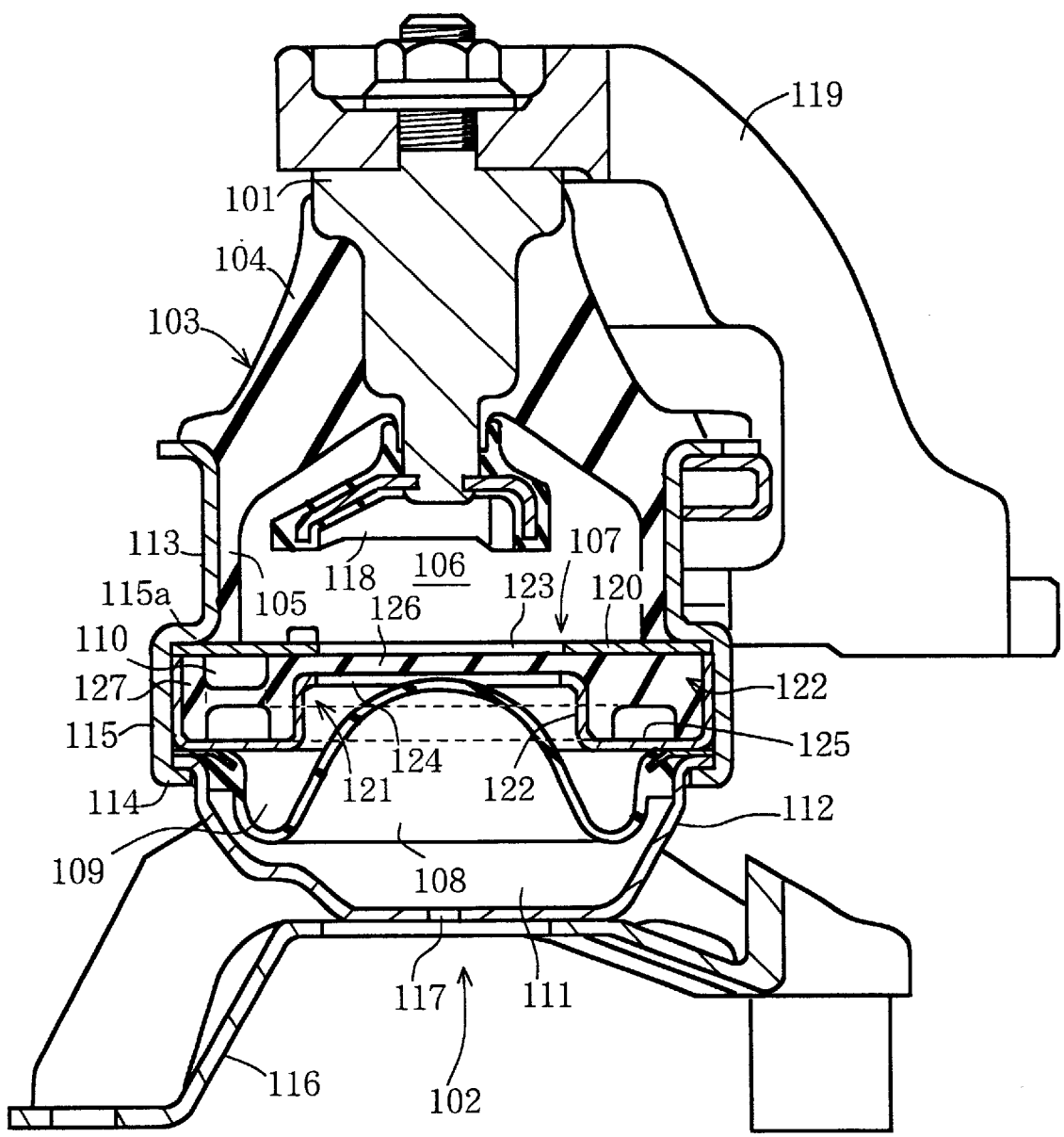

FIG. 22 is a principle drawing explaining a method of use of the support ring 66 and showing a state before caulking from the arrow Y direction in FIG. 17. It illustrates the state wherein outer peripheral portion 65 of the ring caulking member 64 is made to be a circular wall before being caulked, the support ring 66 is inserted in the state of being roughly rounded. The support ring 66 is arranged to surround each outer end portion of the thick portion 63 of the elastic membrane 61 and the outer peripheral portion 62a of the bottom member 62.

In this time, both ends of the longitudinal direction of the support ring 66 are unnecessary to connect mutually and may open. Still more, the whole ring body is unnecessary to contact to each outer end portion of the thick portion 63 and bottom member 62.

When the support ring 66 is arranged as mentioned above, superposed on the caulking ring member 64, as shown by an arrow in FIG. 20, and the outer peripheral portion 65 side thereof is bent by caulking towards the outer peripheral portion 62a of the bottom member 62, since the outer peripheral portion 65 is bent inward, it reduces the diameter of the support ring 66.

When the diameter of the support ring 66 can no longer be reduced by virtue of contacting closely to each outer end portion of the thick portion 63 and the bottom member 62, the outer peripheral portion 65 is bent sharply as a fulcrum at the contact portion with the support ring 66.

Therefore, the support ring 66 functions to give a bending point of the outer peripheral portion 65, at the time the caulking ring member 64 is caulked which makes it possible for the bending of the outer peripheral portion 65 to be sharp and accurate.

Moreover, since the support ring 66 is sufficient to be a simple strap shaped material, and the rounding process thereof is not a process requiring special precision and enough to be a process of manual working level allowing rather dispersion, the material cost and the processing cost can be remarkably reduced as compared with the effect attained when using the process and such a kind of processing cost can be reduced drastically. This caulking technique can not be limited to the assembly of the valve assembly 22 and can be applied in all purpose to the various use to fix the two cylindrical members by caulking.

Next, referring to FIGS. 23 to 27, another embodiment is described relating to the liquid sealed anti-vibration mount having an alternative construction composed as an engine mount for an automobile. First, referring to FIG. 23, the rough construction of the liquid sealed anti-vibration mount is described. The liquid sealed anti-vibration mount comprises a first mounting member 101 mounted to an engine side as a vibration source, a second mounting member 102 mounted to a body side as a vibration receiving side and an elastic member 103 connecting between the first mounting member 1 and the second mounting member 2.

The elastic member 103 comprises a conical member 104 having a generally truncated cone shape made of rubber, suitable elastomer or the like and a cylindrical member 105 extending continuously from a lower bottom side thereof. A concave portion disposed with an opening on the cylindrical member 105 side is provided inside, and a main fluid chamber 106 is formed inside thereof and non-compressible liquid is filed therein.

An opening portion of the concave portion is closed by a partitioning member 107 and an opposite side of the main fluid chamber 106 relating to the partitioning member 107 is covered by a diaphragm 108. A sub liquid chamber 109 is formed between the diaphragm 108 and the partitioning member 107 and is communicated with the main liquid chamber 106 by an orifice passage 110 formed in the partitioning member 107.

The outer peripheral portion of the partitioning member 107 and the diaphragm 108 is caulked with the cup member 112 forming a diaphragm deforming space 111 for deforming the diaphragm 108 by a caulking portion 114 formed at an apex portion of a cylindrical metal member 113.

Figure 25:
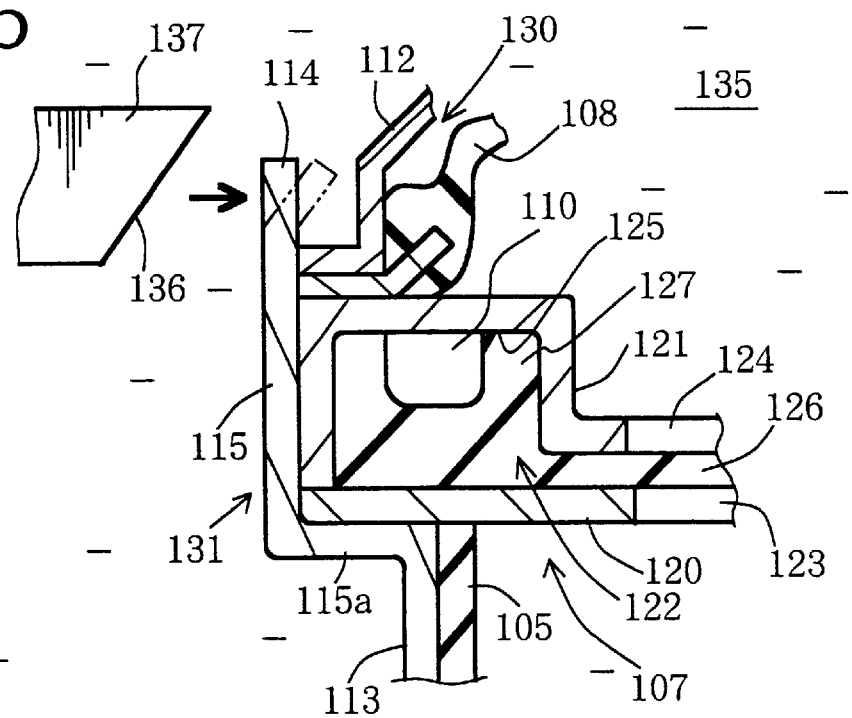

The cylindrical metal member 113 is a member covering an outer side of the cylindrical portion 105 composing the elastic member 103 and as is apparent from FIG. 25, the caulking portion 114 is formed at an apex portion of an enlarged diameter extending portion 115 extending more from an end position of the cylindrical member 105. Which is adapted to position the partitioning member 107 on a shoulder portion 115a of the enlarged diameter portion and a small diameter portion overlapping to the cylindrical portion 105.

A cup member 112 is a member composing the second mounting member 102 with a bracket 116 attached on outer peripheral portion thereof and an atmosphere communicating hole 117 is formed at a center thereof.

The first mounting member 101 is disposed to pass through along a center line of the conical portion 104 composing the elastic member 103. On an inner end portion projecting toward the main liquid chamber 106, a medium frequency device 118 is attached, which forms a medium frequency orifice between an inner wall of the conical portion 104 therewith. A bracket 119 is screwed on an outer end portion.

The partitioning member 107 comprises a circular plate 120, a cup shaped holder 121 utilized as a lid thereof and a circular elastic member 122 supported by the holder 121. The respective diameter of the circular plate 120 and the holder 121 coincide and are almost the same as an inner diameter of the enlarged diameter extending portion 115.

A center portion of the circular plate 120 is adapted to have a large opening 123 and corresponds to it, a large opening 124 is also formed at the center of the holder 122. A peripheral portion is made to be a ring shaped groove 125 that is deeper than the center portion.

The circular elastic member 122 is formed from an elastic material such as rubber, elastomer or the like, and a center portion thereof is adapted to be an elastic membrane 126 facing the upper and lower openings 123 and 124. The circular elastic member 122 is made to be capable of absorbing an inner pressure by the elastic deformation through the change of the inner pressure of the main liquid chamber 106.

The outer peripheral portion of the elastic membrane member 126 is adapted to be an orifice portion 127 shaped as a thick ring to fit in the ring portion 125 and the orifice passage 110 is formed in a substantially spiral shape in the thick dimension. One end thereof is communicated to the main fluid chamber 106 by the opening (not shown) formed in the circular plate 120 and another end thereof is communicated to the sub liquid chamber 109 by the opening (not shown) formed in the bottom portion of the ring portion 125.

Figure 24:
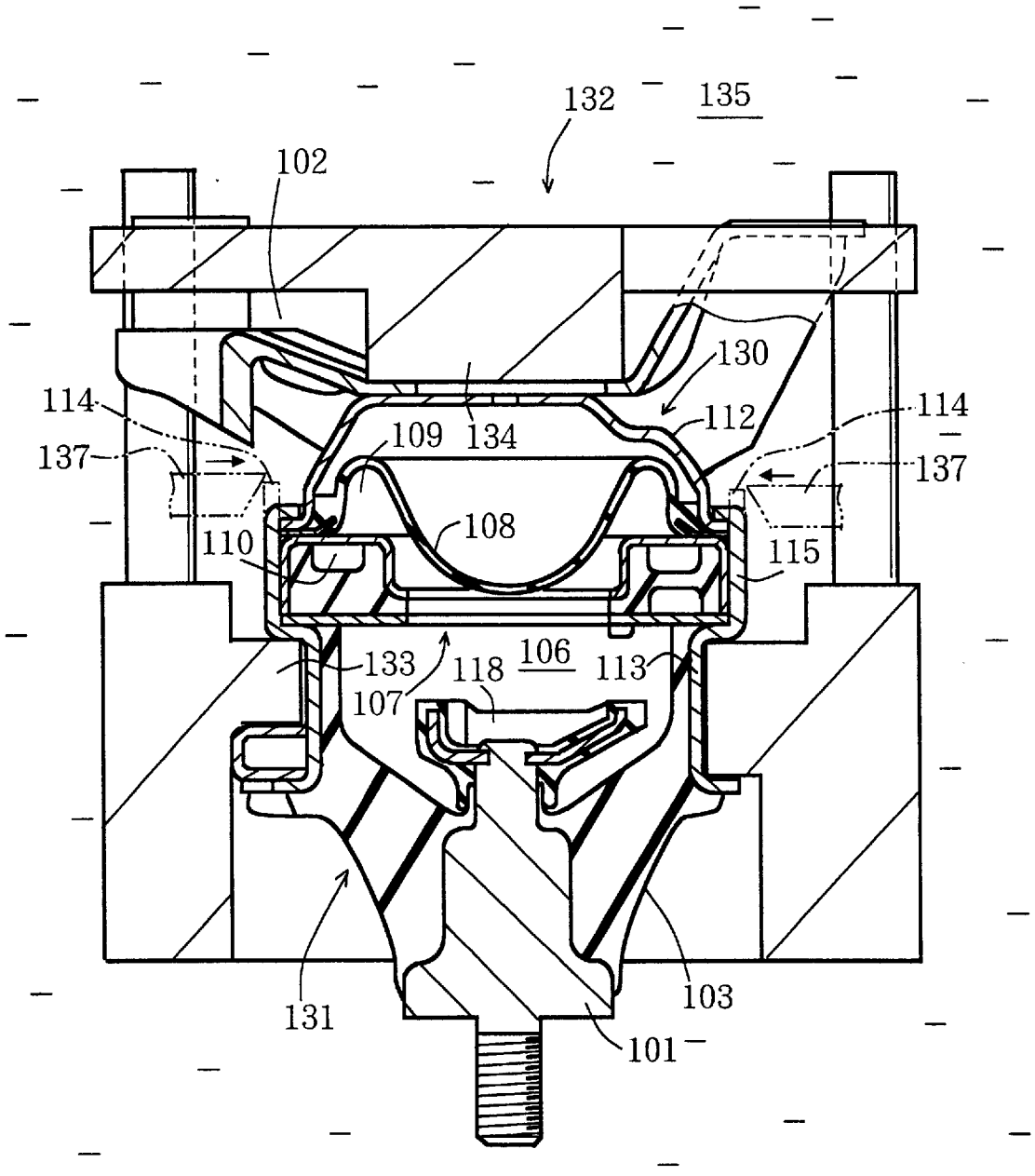

Next, an assembling process of the liquid sealed antivibration mount is described. As shown in FIG. 24, a bottom side assembly 130 (see FIG. 22) superposed on a liquid tight the diaphragm 108 with the cup member 112 on the respective outer peripheral portion is fitted following the partitioning member 107 in the enlarged diameter extending portion 115 of the top side assembly 131 (see FIG. 27) integrating the first mounting member 101 and the elastic member 103 with the cylindrical metal member 113 in the state before caulking the caulking portion 114.

In this state, a peripheral portion of narrow diameter portion as the main body of the cylindrical metal member 113 is supported by a top side support portion 133 of a jig 132 and after a center portion of a bottom side assembly 130 is temporarily supported, the whole body is made up side down and immersed in a liquid bath filled with non-compressible liquid.

Thereafter, liquid is charged until reaching to the specified liquid pressure level in the liquid bath by virtue of floating the bottom side assembly 130 in the upper portion than the partitioning member 107. Then, the bottom side supporting portion 134 is pushed out downwardly and the bottom side assembly 130 is pushed tightly against the partitioning member 107 and fixed.

Figure 26:
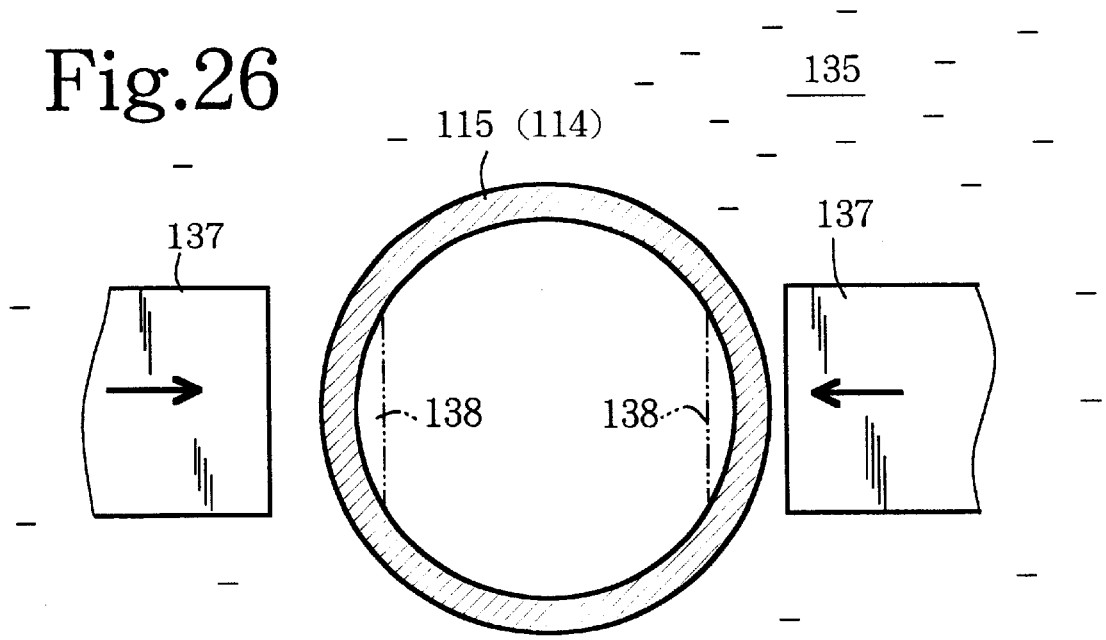

In this state, as shown FIGS. 25 and 26, a slide member 137, an apex thereof is made to be a tapered surface 136, is pushed out inwardly from the opposed right and left outer direction of the caulking portion 114. A pushed down of a part of the caulking portion 114 at opposed right and left position forming the temporary caulking portion 138 (FIG. 26) makes the temporary caulking.

In this time, though the area of the temporary caulking portion 138 is limited partially, the temporary caulking is performed easily and surely by the tapered surface 136.

By the temporary caulking, since the bottom side assembly 130 and the top side assembly 131 are connected in the state that the sealing performance is secured for inside filled liquid in the extent of treating in the formal caulking and the like, the device is taken out from the liquid bath 135 and can be treated relatively freely outside of the liquid bath.

After disassembly the jig 132, when the caulking portion 114 is caulked formally for the bottom side assembly 130 and the top side assembly 131, both are temporarily caulked, by roll caulking or the like, a finished product of the liquid filled mount is obtained.

As mentioned above, since extremely careful treatment for securing the seal performance is arranged to be unnecessary and it can save the time for assembly, the processing efficiency can be remarkably improved.

Moreover, since the roll caulking or other well known caulking method can be adopted for the formal caulking, the degree of freedom in processing can be raised.

The present invention is not limited to the above mentioned embodiment and is possible to be modified in various ways, for example, a position and a direction of the caulking is possible in an optional number of positions and from optional directions such as three directions or four directions.

Further, the bottom side assembly 130 is composed of not only the diaphragm 108 and the cup member 112, but also may be integrated with a control mechanism changing a plurality of the orifice passage provided beforehand and may be composed of merely a diaphragm.

Figure 27:
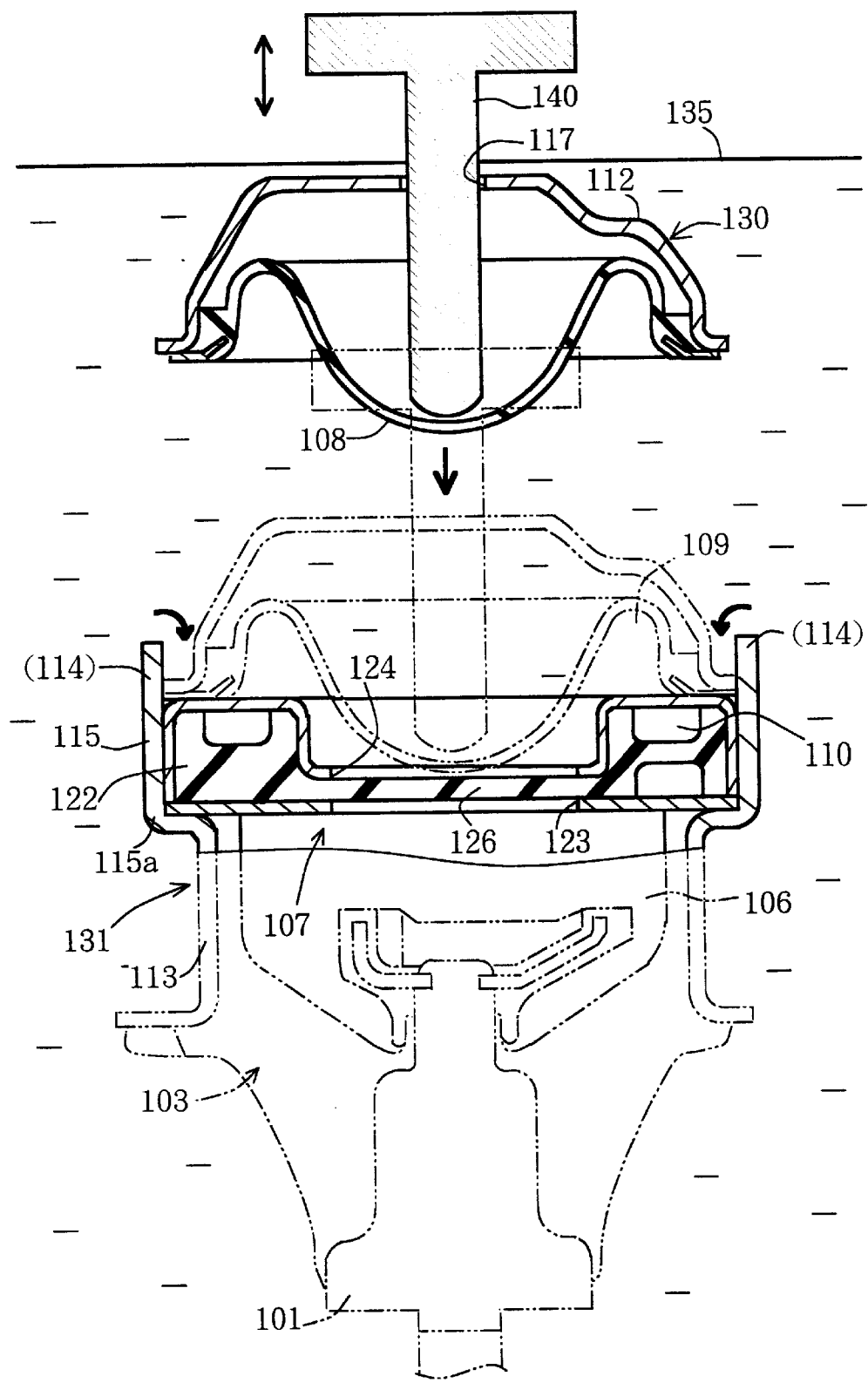

Next, a controlling method of the filling liquid performed before the caulking process in FIG. 24 is described. As shown in FIG. 27, a top side assembly 131 integrated with the first mounting member 101, the elastic member 103 and the cylindrical metal member 113 in the state before caulking the caulking portion 114, is made to be up side down. Which is immersed into the liquid bath 135 filled up with non-compressible liquid in the state that the partitioning member 107 is supported by the shoulder portion 115a.

Following this, the bottom side assembly 130 formed by superposing liquid-tightly the diaphragm 108 and the cup member 112 on the outer peripheral portion is immersed into the liquid bath 135 and is piled on the partitioning member 107.

In this time, a pole shaped controlling member 142 is inserted to move freely through the atmosphere communicating hole 117 and the diaphragm 108 is beforehand deformed by being pushed in toward the partitioning member 107 Ride. As the atmosphere communicating hole 117 serves also as a control hole used for the liquid volume control of the filling liquid, it possesses a rather larger diameter as compared with the case aiming to function for merely the usual atmosphere communicating hole.

The controlling member 140 is required to be in the state of measuring the liquid pressure by connecting a pressure gauge or to be more convenient, to be controlled by a stroke value thereof decided beforehand to correlate with the filling liquid volume. (Following description is referred to the convenient method.)

When the diaphragm and the cup member are superposed, the non-compressive liquid is confined in the main liquid chamber 106, the orifice passage 110 and sub liquid chamber 109, and the filled liquid volume can be checked by the stroke value of the controlling member 140.

The deforming value of the diaphragm is made to be controlled by moving the controlling member 140 for the filling liquid volume to be specified value and at the same time, the excessive or lack liquid is adapted to be discharged or supplemented by lifting the bottom side assembly 130.

In the stage that the filling liquid volume has been controlled to reach to the specified value, the bottom side assembly 130 and the partitioning member 107 is caulked temporarily in the liquid by virtue of bending inward a part of the caulking portion as shown in FIGS. 24 and 25,.

Thereafter, when the top side assembly 131 and the bottom side assembly 130 are taken out from the liquid bath 135 and caulked formally by the suitable method such as a roll caulking, the assembly process thereof is finished. But, even without the temporary caulking, it can be caulked formally directly outside the liquid bath.

As described above, since the bottom side assembly 130 is caulked and fixed while making the deformation value of the diaphragm 108 to change using the controlling member 142, the filled liquid volume can be controlled to a specified value before caulking.

Therefore, since it does not appeared that an inferior liquid pressure is found for the first time by the measurement after caulking, the quality of the products can be at a higher level and the yield rate can be remarkably improved.

Moreover, the cup member 112 as a part of the second mounting member 102 can be integrated at the same time of caulking and fixing of the partitioning member 107 and the diaphragm 108. But, the mounting of the cup member 112 may be separated from the diaphragm 108 and laid on another place.

In the case of that the liquid pressure is adapted to be measured directly via the controlling member 140 as mentioned above, it is possible not only to control more accurately the liquid pressure and to operate easily the control of the diaphragm 108 but also to assemble while checking the whole product. Further, the special construction for the control on the anti-vibration device side can be unnecessary by utilizing the atmosphere communicating hole 117 provided beforehand on the cup member 112 as the control hole.

Moreover, when the controlling of the liquid pressure is operated, it is necessary to make the atmosphere communicating hole 17 as large as for the controlling member 14 to be able to pass through. In the case of using the jig 132 shown in FIG. 24 to make possible the operation of the controlling member 140, it is adapted to eliminate beforehand the bottom side supporting portion 134 or to form the through hole to pass through the controlling member 140. However, the present controlling method is not necessary to combine to the caulking process shown in FIGS. 24 and 26 and independently done. Further, in this case, it may be adapted to the above-mentioned liquid filled mount integrated with the controlling mechanism to switch the plural orifice passages.

What is claimed is:

1. A process for manufacturing an anti-vibration device comprising an elastic member having a truncated cone shape when viewed from a side, said elastic member having a side portion, an upper portion and a lower portion; a first mounting member connected to the upper portion of said elastic member; a second mounting member connected to the lower portion of said elastic member; a stopper projection projecting from the first mounting member to a side portion for abutting on the side portion of the elastic member; and a stopper projection receiving portion extending upwardly from the second mounting member and positioned adjacent to the stopper projection to form a stopper projection receiving portion with a specified gap formed between the side portion of the elastic member and said stopper projection receiving portion, wherein said process comprises the steps of: p1 securing one end of the first mounting member with one end of the second mounting member;

positioning a jig having a side projecting portion on the first mounting member;

placing the side projecting portion of the jig for forming the stopper projection receiving portion adjacent to and on one side of the elastic member;

bending an apex portion of the stopper projection receiving portion to conform to the side projecting portion of the jig; and removing the jig by rotating the jig approximately a half rotation around a center line of the elastic member for moving the side projecting portion to a position away from the stopper projection receiving portion.

2. The process for manufacturing the anti-vibration device according to claim 1, wherein a bead portion is formed in said stopper projection receiving portion by bending said stopper projection receiving portion at a predetermined position.

3. The process for manufacturing the anti-vibration device according to claim 1, the process comprises the further steps of:

providing a pivot plate formed in a substantially circular shape pivotable around a mounting shaft attached to the first mounting member along a center line of the stopper projection receiving portion;

positioning the stopper projection in a position engaged with a half round portion of said pivot plate;

mounting the pivot plate to the mounting shaft to position the stopper projection on a side away from a mounting position of the stopper projection of the elastic member;

admitting the stopper projection to a space formed between the stopper projection receiving portion and the elastic member while rotating the pivot plate about a half turn around the mounting shaft; and stopping the rotation of the pivot plate against the first mounting member.

4. A process for manufacturing an anti-vibration device, comprising the following steps:

superposing peripheral portions of two circular members in a face to face relationship provided in the anti-vibration device;

arranging a rolled strap shaped support ring to extend along the peripheral portion of said circular members; and connecting by caulking an outer peripheral portion of each of said two circular members by bending a ring caulking member arranged along each outer peripheral portion in the shape of about a U-section to wrap the support ring inside.

5. The process for manufacturing the anti-vibration device according to claim 4, wherein the two circular members are respectively adapted to be formed from an easily deformable nonmetal material.

6. The process for manufacturing the anti-vibration device according to claim 4, wherein the process includes the additional steps of:

forming at least either member of the circular members from soft elastic material;

composing the two circular members to form an enclosed space by arranging each member in a face to face relationship;

securing the outer peripheral portion of the soft elastic member with an inner tide of said ring caulking member; and sealing fluid-tightly the connecting portion of the two circular members by caulking the outer peripheral side of the caulking ring member to wrap an outer peripheral portion of formed on at least one of said two circular members.

7. The process for manufacturing the anti-vibration device according to claim 6, wherein the two cylindrical members are made from resin, said two cylindrical members are an elastic membrane and a bottom member forming a valve assembly to open and close an orifice passage in the anti-vibration device having the orifice passage freely opened and closed and a negative pressure chamber is formed between the membrane and the bottom member.

* * * * *